US007276111B2

(12) United States Patent
Oki et al.

(10) Patent No.: US 7,276,111 B2
(45) Date of Patent: *Oct. 2, 2007

(54) INK COMPOSITION, INKJET RECORDING METHOD AND RECORDED MATTER

(75) Inventors: Yasuhiro Oki, Nagano-ken (JP); Kazuhiko Kitamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 345 days.

This patent is subject to a terminal disclaimer.

(21) Appl. No.: 11/042,832

(22) Filed: Jan. 25, 2005

(65) Prior Publication Data

US 2005/0183630 A1 Aug. 25, 2005

(30) Foreign Application Priority Data

Feb. 9, 2004 (JP) ............................. 2004-031869
Feb. 19, 2004 (JP) ............................. 2004-042663

(51) Int. Cl.
*C09D 11/00* (2006.01)
*C09D 11/02* (2006.01)
*B41J 2/01* (2006.01)
(52) U.S. Cl. ............................. 106/31.49; 106/31.46; 106/31.47; 106/31.58; 106/31.59; 347/100
(58) Field of Classification Search ............. 106/31.49, 106/31.47, 31.46, 31.58, 31.59; 347/100
See application file for complete search history.

(56) References Cited

U.S. PATENT DOCUMENTS

| | | | | |
|---|---|---|---|---|
| 4,163,675 | A * | 8/1979 | Hirano et al. ............. | 106/31.43 |
| 5,478,383 | A * | 12/1995 | Nagashima et al. ...... | 106/31.43 |
| 6,319,309 | B1 * | 11/2001 | Lavery et al. ............ | 106/31.27 |
| 6,379,441 | B1 * | 4/2002 | Kanaya et al. ............ | 106/31.49 |
| 7,083,669 | B2 * | 8/2006 | Fukumoto et al. ........ | 106/31.49 |

(Continued)

FOREIGN PATENT DOCUMENTS

EP 0 922 737 6/1999

(Continued)

OTHER PUBLICATIONS

English Abstract of WO 03/000811 dated Jan. 3, 2003.

(Continued)

*Primary Examiner*—Helene Klemanski
(74) *Attorney, Agent, or Firm*—Ladas and Parry LLP

(57) ABSTRACT

An object of the present invention is to provide an ink composition that can improve the preservation characteristics (gas fastness) of an image produced by an ink composition which uses phthalocyanine group cyan dye. The present invention provides an ink composition wherein at least water, the phthalocyanine group cyan dye indicated by the general formula (I), and an aromatic compound having a sulfone group and/or the salt thereof represented by the general formulae (a) and/or (b) are contained; and an ink composition wherein at least water, the phthalocyanine group cyan dye indicated by the general formula (VIII), and an aromatic compound having a sulfone group and/or the salt thereof represented by the general formulae (a) and/or (b) are contained. Moreover, the present invention provides an inkjet recording method in which recording is conducted by discharging ink droplets of an ink composition and causing the ink droplets to adhere to a recording medium, wherein as said ink composition, the aforementioned ink composition is used. Further, the present invention provides a record which is obtained by using the aforementioned ink composition.

19 Claims, 1 Drawing Sheet

U.S. PATENT DOCUMENTS

| | | | |
|---|---|---|---|
| 2004/0099181 A1 | 5/2004 | Tateishi et al. | |
| 2005/0183630 A1* | 8/2005 | Oki et al. | 106/31.49 |
| 2006/0135646 A1* | 6/2006 | Oki et al. | 523/160 |
| 2006/0203059 A1* | 9/2006 | Oki et al. | 347/100 |
| 2006/0233976 A1* | 10/2006 | Uhlir-Tsang et al. | 428/32.34 |

FOREIGN PATENT DOCUMENTS

| | | |
|---|---|---|
| EP | 1 088 864 | 4/2001 |
| EP | 1 357 158 | 10/2003 |
| EP | 1 408 093 | 4/2004 |
| JP | 10-036471 | 2/1998 |
| JP | 2002-249677 | 9/2002 |
| JP | 2002-256167 | 9/2002 |
| JP | 2002-275386 | 9/2002 |
| JP | 2002-285050 | 10/2002 |
| JP | 2002-294097 | 10/2002 |
| JP | 2002-302623 | 10/2002 |
| JP | 2002-309118 | 10/2002 |
| JP | 2003-213167 | 7/2003 |
| JP | 2003-213168 | 7/2003 |
| JP | 2004-002670 | 1/2004 |
| WO | 98/41853 | 9/1998 |
| WO | 99/50363 | 10/1999 |
| WO | 00/08101 | 2/2000 |
| WO | 00/08103 | 2/2000 |
| WO | 00/17275 | 3/2000 |
| WO | 02/060994 | 8/2002 |
| WO | 03/000811 | 1/2003 |
| WO | 03/062323 | 7/2003 |

OTHER PUBLICATIONS

Patent Abstracts of Japan of JP 2004-002670 dated Jan. 8, 2004.
Patent Abstracts of Japan of JP 2003-213168 dated Jul. 30, 2003 and JPO English Computer-Generated Translation of Claims.
Patent Abstracts of Japan of JP 2003-213167 dated Jul. 30, 2003 and JPO English Computer-Generated Translation of Claims.
Patent Abstracts of Japan of JP 2002-309118 dated Oct. 23, 2002.
Patent Abstracts of Japan of JP 2002-302623 dated Oct. 18, 2002.
Patent Abstracts of Japan of JP 2002-294097 dated Oct. 9, 2002.
Patent Abstracts of Japan of JP 2002-285050 dated Oct. 3, 2002.
English Abstract of WO 02/060994 dated Aug. 8, 2002.
English Abstract of WO 00/17275 dated Mar. 30, 2000.
English Abstract of WO 99/50363 dated Oct. 7, 1999.
Patent Abstracts of Japan of JP 2002-275386 dated Sep. 25, 2002.
Patent Abstracts of Japan of JP 2002-256167 dated Sep. 11, 2002 and JPO English Computer-Generated Translation of Claims.
Patent Abstracts of Japan of JP 2002-249677 dated Sep. 6, 2002 and JPO English Computer-Generated Translation of Claims.
Patent Abstracts of Japan of JP 10-036471 dated Feb. 10, 1998 and JPO English Computer-Generated Translation of Claims.

* cited by examiner

INK COMPOSITION, INKJET RECORDING METHOD AND RECORDED MATTER

BACKGROUND

1. Field of the Invention

The present invention relates to an ink composition that can improve the preservation characteristics (gas fastness) of an image to be produced, and, in more detail, to an ink composition containing phthalocyanine group cyan dye that can effectively prevent image fading.

2. Description of the Prior Art

Ink compositions using phthalocyanine group cyan dye have commonly been used in the past as superior ink compositions for coloring cyan images. Moreover, recently a widespread practice is to form an image using this kind of ink composition to color an image together with one or two or more ink compositions for coloring other colors, and to display the multi-color image thus obtained (color image) in a room, etc.

However, in ink compositions using this phthalocyanine group cyan dye, the phthalocyanine group cyan dye has poor fastness to the oxidizing gases present in the atmosphere such as ozone, nitrous oxide and sulfuric oxide, with especially poor ozone fastness. Therefore, when forming a multi-color image together with ink compositions of other colors and displaying said image in a room, there has been the problem that the image formed from said cyan dye fades rapidly.

Various types of ink compositions have been invented in order to prevent this kind of phthalocyanine fading. For example, in WO Patent Publication No. 99/50363 a cyan ink composition comprising copper phthalocyanine group cyan dye, imidazole derivative, anti-oxidation agent, sugar, and any naphthalene-1-sulfonate containing a hydroxyl group or amino group in position 4 is disclosed as a means to improve lightfastness (Patent Literature 1). However, this ink composition was not evaluated for ozone gas fastness, and has a hydrochloric acid group or amino group in the molecule of the components used, and for this reason has the problem that nitrous oxides (NOx gases) can cause the phenomena of turning the image green or black.

[Patent Literature 1] WO Patent Publication No. 99/50363

Consequently, an object of the present invention is to provide an ink composition that can improve the preservation characteristics (gas fastness) of an image produced by an ink composition using phthalocyanine group cyan dye.

SUMMARY

As a result of assiduous study the present inventors discovered that the previously described object could be achieved by an ink composition containing an aromatic compound that that uses a specified phthalocyanine group cyan dye as the cyan dye and that has a specified sulfone group.

The present invention is based on the aforementioned discovery, and provides an ink composition comprising at least water, phthalocyanine group cyan dye, and an aromatic compound having a sulfone group and/or the salt thereof.

DETAILED DESCRIPTION

Figure 1:
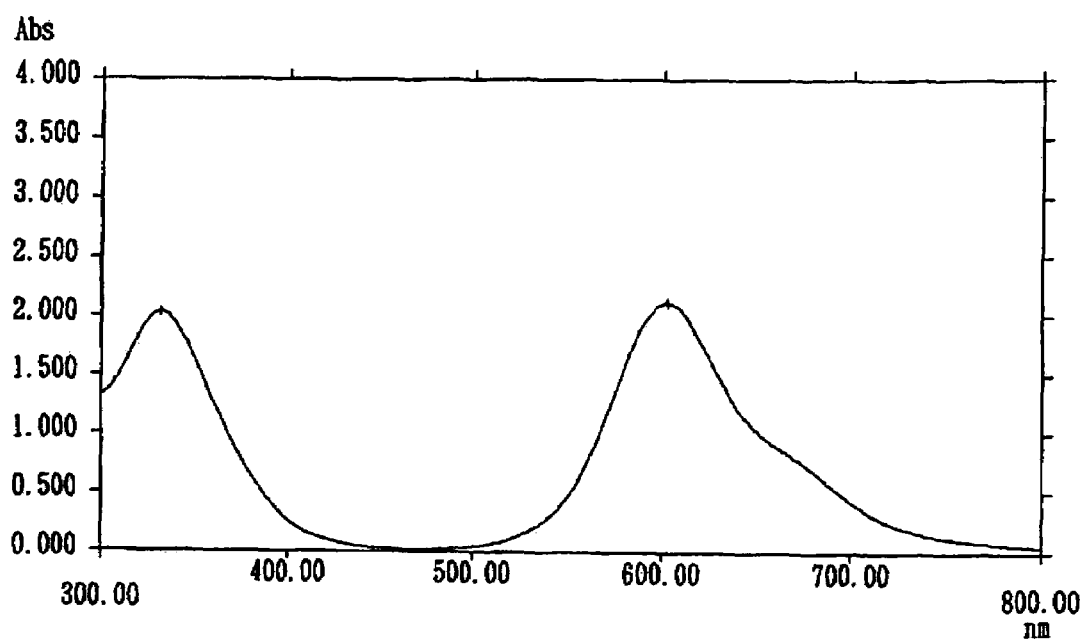
FIG. 1 indicates the spectroscopic characteristics (absorption wavelength) of a dye contained in an ink composition (C.I. direct blue 199) of a comparative example.

The present invention is based on the aforementioned findings, and provides: 1. an ink composition, wherein at least water, the phthalocyanine group cyan dye indicated by the general formula (I) below, and an aromatic compound having a sulfone group and/or the salt thereof represented by the general formulae (a) and/or (b) below are contained.

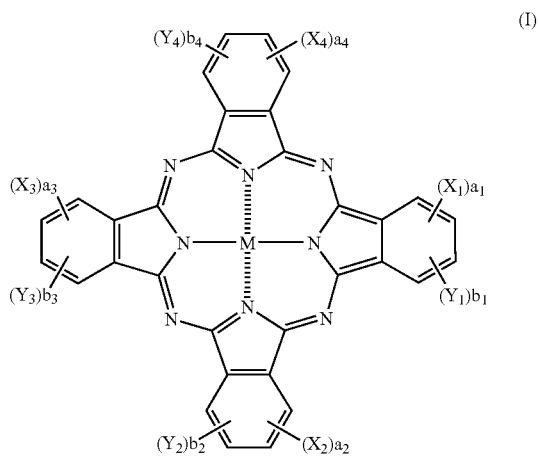

(I)

(In the formula, $X_1$, $X_2$, $X_3$ and $X_4$ each independently represents either —SO-Z or —$SO_2$-Z. Here, Z each independently represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group.

$Y_1$, $Y_2$, $Y_3$ and $Y_4$ each independently represents a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureide group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group or ionic hydrophilic group; and these various groups may have substituents.

$a_1$ to $a_4$ and $b_1$ to $b_4$ represent the number of substituents of $X_1$ to $X_4$ and $Y_1$ to $Y_4$ respectively. Now then, $a_1$ to $a_4$ each independently is an integer of 0 to 4, but not all may be 0 at the same time. $b_1$ to $b_4$ each independently is an integer of 0 to 4.

M represents a hydrogen atom, metal element or oxide thereof, hydroxide, or halogenated compound.

However, at least one of $X_1$, $X_2$, $X_3$, $X_4$, $Y_1$, $Y_2$, $Y_3$, and $Y_4$ is an ionic hydrophilic group or a group having an ionic hydrophilic group as a substituent.)

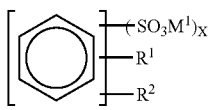

(In the formula, $M^1$ indicates an counter-ion comprising a salt; X indicates an integer of 1 to 3; $R^1$ and $R^2$ indicate respectively a hydrogen atom, an alkyl group having 1 to 6 carbon atoms, or an alkoxy group having 1 to 6 carbon atoms; and $R^1$ and $R^2$ may be the same or different.)

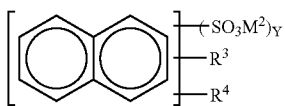

(In the formula, $M^2$ indicates an counter-ion comprising a salt; Y indicates an integer of 1 to 4; $R^3$ and $R^4$ indicate respectively a hydrogen atom, an alkyl group having 1 to 6 carbon atoms or an alkoxy group having 1 to 6 carbon atoms; and $R^3$ and $R^4$ may be the same or different.)

Moreover, the present invention provides: 2. an ink composition, wherein at least water, the phthalocyanine group cyan dye indicated by the general formula (VIII) below, and an aromatic compound having a sulfone group and/or the salt thereof represented by the general formulae (a) and/or (b) below are contained.

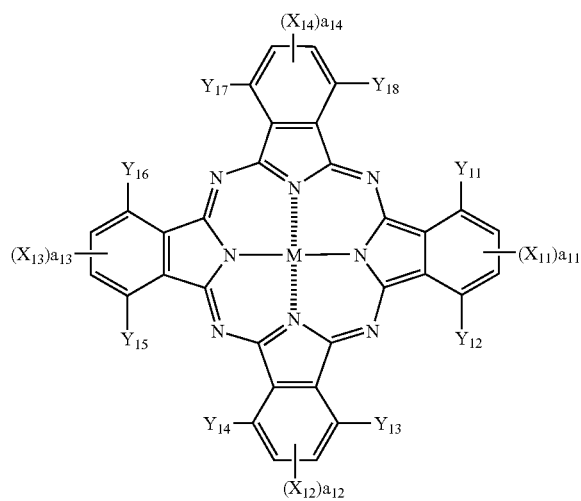

(VIII)

(In the formula, $X_{11}$, $X_{12}$, $X_{13}$ and $X_{14}$ each independently represent —$SO_2NR_1R_2$ an/or a sulfone group. However, $X_{11}$, $X_{12}$, $X_{13}$ and $X_{14}$ may not all be sulfone groups at the same time. Here, $R_1$ each independently represents, if a plurality thereof are present, a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group. Here, $R_2$ each independently represents, if a plurality thereof are present, a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group. $R_1$ and $R_2$ may be mutually bonded and may form a nitrogen heterocycle with 5 to 6 members.

$Y_{11}$, $Y_{12}$, $Y_{13}$, $Y_{14}$ $Y_{15}$, $Y_{16}$ $Y_{17}$ and $Y_{18}$ each independently represents a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureide group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group or ionic hydrophilic group; and these various groups may have substituents.

$a_{11}$ to $a_{14}$ respectively represent the number of substituents of $X_{11}$ to $X_{14}$, and each independently is an integer of 0 to 2, but not all may be 0 at the same time.

M represents a hydrogen atom, metal element or oxide thereof, hydroxide, or halogenated compound.

Here, at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$, and $Y_{18}$ is an ionic hydrophilic group or a group having an ionic hydrophilic group as a substituent.)

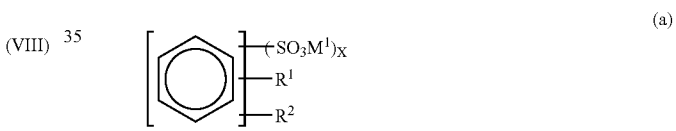

(In the formula, $M^1$ indicates an counter-ion comprising a salt; X indicates an integer of 1 to 3; $R^1$ and $R^2$ respectively indicate a hydrogen atom, an alkyl group having 1 to 6 carbon atoms, or an alkoxy group having 1 to 6 carbon atoms; and $R^1$ and $R^2$ may be the same or different.)

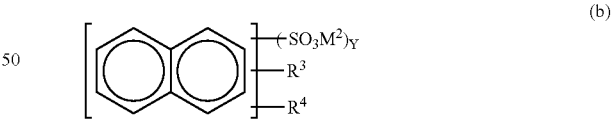

(In the formula, $M^2$ indicates an counter-ion comprising a salt; Y indicates an integer of 1 to 4; $R^3$ and $R^4$ respectively indicate a hydrogen atom, an alkyl group having 1 to 6 carbon atoms or an alkoxy group having 1 to 6 carbon atoms; and $R^3$ and $R^4$ may be the same or different.)

Moreover, the present invention provides the ink composition, ink cartridge, inkjet recording method, and record respectively indicated below.

3. An ink composition described in 1, wherein the phthalocyanine group cyan dye indicated in the general formula (I) is a phthalocyanine group dye indicated in the general formula (II) below.

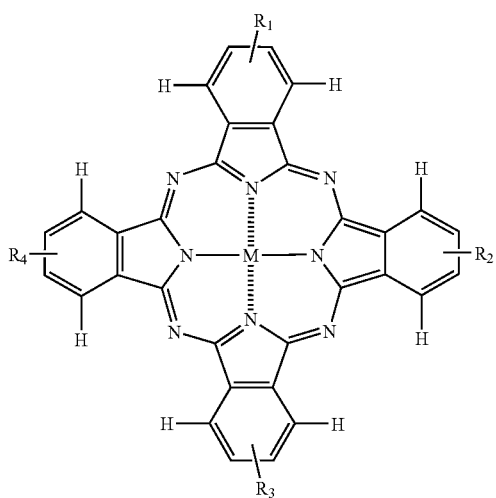

(II)

(In the formula, M is the same as in the general formula (I), and R1 to R4 each independently represents —SO$_2$Z. Z is the same as in the general formula (I). However, at least one of the four Zs has an ionic hydrophilic group as a substituent.)

4. An ink composition described in 2, wherein the phthalocyanine group cyan dye indicated in the general formula (VIII) is a phthalocyanine group dye indicated in the general formula (IX) below.

(In the formula, $R_{11}$, $R_{12}$, $R_{13}$, and $R_{14}$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group.)

$V_1$, $V_2$, $V_3$, and $V_4$ each independently represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group.

$Y_{31}$, $Y_{32}$, $Y_{33}$, $Y_{34}$, $Y_{35}$, $Y_{36}$, $Y_{37}$, and $Y_{38}$ each independently represents a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureide group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group or ionic hydrophilic group; and these various groups may have substituents.

M is the same as the M in the general formula (VIII).

Here, at least one of $R_{11}$, $R_{12}$, $R_{13}$, $R_{14}$, $V_1$, $V_2$, $V_3$, $V_4$, $Y_{31}$, $Y_{32}$, $Y_{33}$, $Y_{34}$, $Y_{35}$, $Y_{36}$, $Y_{37}$, and $Y_{38}$ is an ionic hydrophilic group or a group having an ionic hydrophilic group as a substituent.)

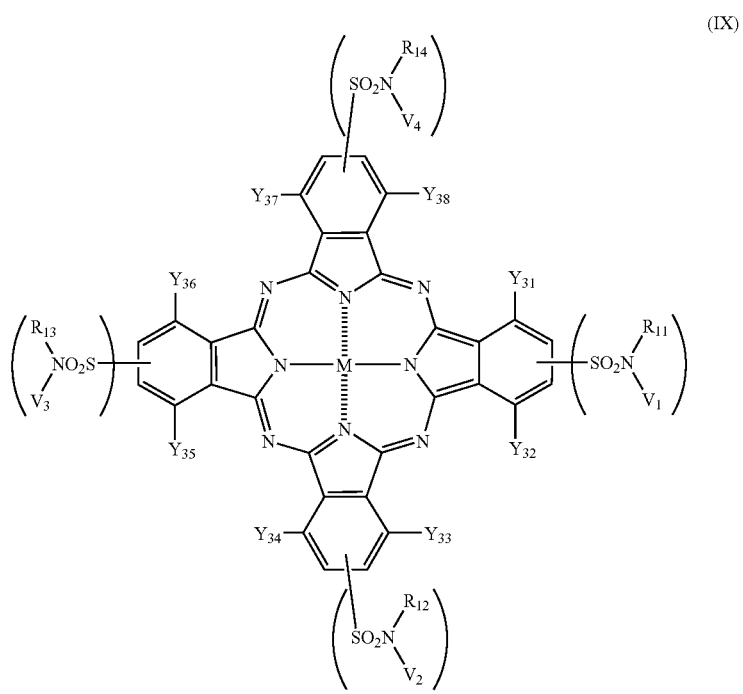

(IX)

5. The ink composition according to 1 or 2, wherein the aromatic compound having a sulfone group and/or the salt thereof has two or more sulfone groups.

6. The ink composition according to 1 or 2, wherein the aromatic compound having a sulfone group and/or the salt thereof is at least one kind selected from the group comprising 1,3-benzene disulfonate, naphthalene-1,5-disulfonate, naphthalene-1,6-disulfonate, naphthalene-2,6-disulfonate, naphthalene-2,7-disulfonate, naphthalene-1,3,6-trisulfonate, and the salts of these.

7. The ink composition according to 1 or 2, wherein the aromatic compound having a sulfone group and/or the salt thereof is contained at 0.1 to 10 weight % in relation to the total amount of the ink composition.

8. The ink composition according to 1 or 2, wherein the content ratio of the phthalocyanine group cyan dye and the aromatic compound having a sulfone group and/or the salt thereof is within the range of 1:0.1 to 1:10.

9. The ink composition according to 1. or 2. further comprising nonionic surfactant.

10. The ink composition according to 9, wherein the aforementioned nonionic surfactant is an acetylene glycol group surfactant.

11. The ink composition according to 9, wherein the nonionic surfactant is contained at 0.1 to 5 weight % in relation to the total amount of the ink composition.

12. The ink composition according to 1 or 2, further comprising a penetrating agent.

13. The ink composition according to 12, wherein the penetrating agent is a glycol ether.

14. The ink composition according to 1 or 2, wherein the pH of the ink composition at 20° C. is 8.0 to 10.5.

15. The ink composition according to 1 or 2, wherein an inkjet recording method is used.

16. The ink composition according to 15, wherein the inkjet recording method is a recording method that uses inkjet heads that form ink drops by mechanical deformation of electrostriction elements.

17. An ink cartridge at least comprising the ink composition described in 1 or 2.

18. An inkjet recording method for conducting recording by discharging ink droplets of an ink composition and causing the ink droplets to adhere to a recording medium, wherein as said ink composition, the ink composition according to 1 or 2 is used.

19. A record, which is obtained by using the ink composition described in 1 or 2.

The ink composition of the present invention will be explained in further detail below based on preferable examples.

As already described, the ink composition of the present invention comprises at least water, phthalocyanine group cyan dye indicated by the aforementioned general formula (I), and an aromatic compound having a sulfone group and/or the salt thereof represented by the aforementioned general formula (a) and/or (b).

Because the ink composition of the present invention comprises the configuration in question, rapid fading of the cyan image can be effectively prevented, and, by extension, the preservation characteristics (gas fastness) of the image produced by this can be improved.

The ink composition of the present invention contains phthalocyanine group cyan dye indicated by the aforementioned general formula (I) and an aromatic compound having a sulfone group and/or the salt thereof represented by the aforementioned general formula (a) and/or (b) in an aqueous solution consisting of water or water and a water soluble organic solvent. Humectants, viscosity modifiers, pH modifiers and other additives may be comprised as necessary.

First, the cyan dye used in the ink composition of the present invention, specifically, the phthalocyanine group cyan dye indicated in the following general formula (I), will be explained in detail.

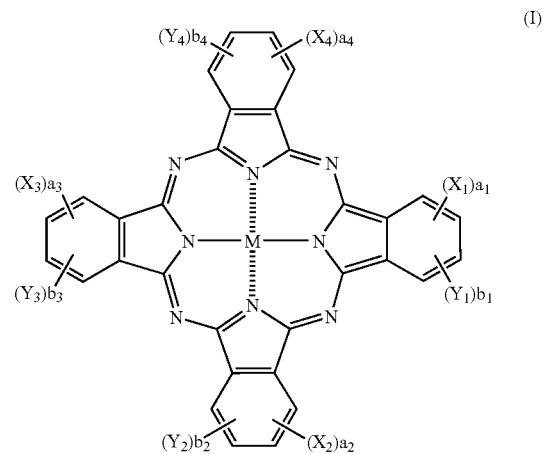

In the aforementioned general formula (I), $X_1$, $X_2$, $X_3$ and $X_4$ each independently represents either —SO-Z or —SO$_2$-Z, and in particular, —SO$_2$-Z is preferred.

Z each independently represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group. In particular, substituted or unsubstituted alkyl group, substituted or unsubstituted aryl group, and substituted or unsubstituted heterocyclic group are preferable; among these, substituted alkyl group, substituted aryl group, or substituted heterocyclic group are more preferable; and further, substituted alkyl group and substituted aryl group are even more preferable, with substituted alkyl group being the most preferred:

The substituted or unsubstituted alkyl group that Z represents is preferably an alkyl group having 1 to 30 carbon atoms. Examples of substituents are the same as substituents when Z, $Y_1$, $Y_2$, $Y_3$, and $Y_4$ can further have a substituent as described later.

The substituted or unsubstituted cycloalkyl group that Z represents is preferably a cycloalkyl group having 5 to 30 carbon atoms. Examples of substituents are the same as substituents when Z, $Y_1$, $Y_2$, $Y_3$, and $Y_4$ can further have a substituent as described later.

The substituted or unsubstituted alkenyl group that Z represents is preferably an alkenyl group having 2 to 30 carbon atoms. Examples of substituents are the same as substituents when Z, $Y_1$, $Y_2$, $Y_3$, and $Y_4$ can further have a substituent as described later.

The substituted or unsubstituted aralkyl group that Z represents is preferably an aralkyl group having 7 to 30 carbon atoms. Examples of substituents are the same as substituents when Z, $Y_1$, $Y_2$, $Y_3$, and $Y_4$ can further have a substituent as described later.

The substituted or unsubstituted aryl group that Z represents is preferably an aryl group having 6 to 30 carbon atoms. Examples of substituents are the same as substituents when Z, $Y_1$, $Y_2$, $Y_3$, and $Y_4$ can further have a substituent as described later.

The heterocyclic group that Z represents preferably has 5 or 6 member rings, and these may be further annelated. Moreover, the heterocycles may be aromatic or non-aromatic. Examples of the heterocyclic groups represented by Z are given below in the form of a heterocycle with the substitution position omitted, but the substitution position is not limited, and if pyridine, for example, may be substituted at positions 2, 3, 4. Examples include: pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperazine, imidizolidine, and thiazoline. Among them, aromatic heterocyclic groups are preferable, and preferable examples thereof include, as described above, pyridine, pyrazine, pyrimidine, pyridazine, triazine, pyrazole, imidazole, benzimidazole, triazole, thiazole, benzothiazole, isothiazole, benzisothiazole, thiadiazole.

These may have substituents, and examples of substituents are the same as substituents when Z, $Y_1$, $Y_2$, $Y_3$, and $Y_4$ can further have a substituent as described later.

$Y_1$, $Y_2$, $Y_3$ and $Y_4$ each independently represents a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureide group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group, or sulfone group; and these various groups may have substituents.

Among them, a hydrogen atom, halogen atom, alkyl group, aryl group, cyano group, alkoxy group, amide group, ureide group, sulfonamide group, carbamoyl group, alkoxycarbonyl group, carboxyl group, and sulfone group are preferable, and particularly, a hydrogen atom, halogen atom and cyano group, carboxyl group and sulfone group are preferable, and a hydrogen atom is most preferable.

If $Y_1$, $Y_2$, $Y_3$, $Y_4$, or Z is a group capable of further carrying substituents, the substituents described below may further be carried.

Examples include: halogen atoms (for example, chlorine atom, bromine atom), linear or branched alkyl groups having 1 to 12 carbon atoms, aralkyl groups having 7 to 18 carbon atoms, alkenyl groups having 2 to 12 carbon atoms, linear or branched alkynyl groups having 2 to 12 carbon atoms, cycloalkyl groups having 3 to 12 carbon atoms that may have side chains, cycloalkenyl groups having 3 to 12 carbon atoms that may have side chains, (more specifically, for example, methyl, ethyl, propyl, isopropyl, t-butyl, 2-methylsulfonylethyl, 3-phenoxypropyl, trifluoromethyl, cyclopentyl), aryl groups (for example, phenyl, 4-t-butylphenyl, 2,4-di-t-amylphenyl), heterocyclic groups (for example, imidazolyl, pyrazolyl, triazolyl, 2-furyl, 2-thienyl, 2-pyrimidinyl, 2-benzothiazolyl), alkyloxy groups (for example, methoxy, ethoxy, 2-methoxyethoxy, 2-methylsulfonylethoxy), aryloxy groups (for example, phenoxy, 2-methylphenoxy, 4-t-butylphenoxy, 3-nitrophenoxy, 3-t-butyloxycarbonylphenoxy, 3-methoxycarbonylphenoxy), acylamino groups (for example, acetamide, benzamide, 4-(3-t-butyl-4-hydroxyphenoxy)butanamide), alkylamino groups (for example, methylamino, butylamino, diethylamino, methylbutylamino), anilino groups (for example, phenylamino, 2-chloroanilino), ureide groups (for example, phenylureide, methylureide, N,N-dibutylureide), sulfamoylamino groups (for example, N,N-dipropylsulfamoylamino), alkylthio groups (for example, methylthio, octylthio, 2-phenoxyethylthio), arylthio groups (for example, phenylthio, 2-butoxy-5-t-octylphenylthio, 2-carboxyphenylthio), alkyloxycarbonylamino groups (for example, methoxycarbonylamino), sulfonamide groups (for example, methanesulfonamide, benzenesulfonamide, p-toluenesulfonamide), carbamolyl groups (for example, N-ethylcarbamoyl, N,N-dibutylcarbamoyl), sulfamolyl groups (for example, N-ethylsulfamoyl, N,N-dipropylsulfamoyl, N,N-diethylsulfamoyl), sulfonyl groups (for example, methylsulfonyl, octylsulfonyl, phenylsulfonyl, 4-methylphenylsulfonyl), alkyloxycarbonyl groups (for example, methoxycarbonyl, butyloxycarbonyl), heterocyclic oxy groups (for example, 1-phenyltetrazole-5-oxy, 2-tetrahydropyranyloxy), azo groups (for example, phenylazo, 4-methoxyphenylazo, 4-pivaloylaminophenylazo, 2-hydroxy-4-propanoylphenylazo), acyloxy groups (for example, acetoxy), carbamoyloxy groups (for example, N-methylcarbamoyloxy, N-phenylcarbamoyloxy), silyloxy groups (for example, trimethylsilyloxy, dibutylmethylsilyloxy), aryloxycarbonylamino groups (for example, phenoxycarbonylamino), imide groups (for example, N-succinimide, N-phthalimide), heterocyclic thio groups (for example, 2-benzothiazolylthio, 2,4-di-phenoxy-1,3,5-triazole-6-thio, 2-pyridylthio), sulfinyl groups (for example, 3-phenoxypropylsulfinyl), phosphonyl groups (for example, phenoxyphosphonyl, octyloxyphosphonyl, phenylphosphonyl), aryloxycarbonyl groups (for example, phenoxycarbonyl), acyl groups (for example, acetyl, 3-phenylpropanoyl, benzoyl), ionic hydrophilic groups (for example, carboxyl group, sulfone group, quaternary ammonium group, sulfonylsulfamoyl group, and acylsulfamoyl group), and other cyano groups, hydroxy groups, nitro groups, and amino groups. Among these substituents, hydroxy groups, alkoxy groups, sulfamoyl groups, sulfonamide groups, acylamino groups, carbamoyl groups, cyano groups, and ionic hydrophilic groups are preferred, and among these, hydroxy groups, sulfamoyl groups and ionic hydrophilic groups are more preferable.

In the general formula (I), $a_1$ to $a_4$, and $b_1$ to $b_4$ represent substituents of $X_1$ to $X_4$, and $Y_1$ to $Y_4$, respectively. $a_1$ to $a_4$ are each independently an integer of 0 to 4, and $b_1$ to $b_4$ are each independently an integer of 0 to 4. Here, if $a_1$ to $a_4$ and $b_1$ to $b_4$ are integers of 2 or more, plurality of $X_1$ to $X_4$ and $Y_1$ to $Y_4$ may be the same or different respectively.

$a_1$ and $b_1$ each independently represents an integer of 0 to 4 satisfying the relation of $a_1+b_1=4$, and particularly preferable are combinations in which $a_1$ represents 1 or 2 and $b_1$ represents 3 or 2, and among them, a combination in which $a_1$ represents 1 and $b_1$ represents 3 is most preferable.

$a_2$ and $b_2$ each independently represents an integer of 0 to 4 satisfying the relation of $a_2+b_2=4$, and particularly preferable are combinations in which $a_2$ represents 1 or 2 and $b_2$ represents 3 or 2, and among them, a combination in which $a_2$ represents 1 and $b_2$ represents 3 is most preferable.

$a_3$ and $b_3$ represent each independently an integer of 0 to 4 satisfying the relation of $a_3+b_3=4$, and particularly preferable are combinations in which $a_3$ represents 1 or 2 and $b_3$ represents 3 or 2, and among them, a combination in which $a_3$ represents 1 and $b_3$ represents 3 is most preferable.

$a_4$ and $b_4$ represent each independently an integer of 0 to 4 satisfying the relation of $a_4+b_4=4$, and particularly preferable are combinations in which $a_4$ represents 1 or 2 and $b_4$ represents 3 or 2, and among them, a combination in which $a_4$ represents 1 and $b_4$ represents 3 is most preferable.

M represents a hydrogen atom, metal element, metal oxide, metal hydroxide or metal halide.

Other than a hydrogen atom, preferable examples of M as a metal element include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. Preferable examples of oxides include VO and GeO. Preferable examples of hydroxides include $Si(OH)_2$, $Cr(OH)_2$ and $Sn(OH)_2$. Further, examples of halides include $AlCl$, $SiCl_2$, $VCl$, $VCl_2$, $VOCl$, $FeCl$, $GaCl$ and $ZrCl$. Among them, particularly, Cu, Ni, Zn, Al, etc. are preferable, and Cu is most preferable.

Moreover, in the phthalocyanine compound represented by the general formula (I), Pc (phthalocyanine ring) may form a dimer (for example, Pc-M-L-M-Pc) or trimer via L (divalent connecting group), and the plurality of Ms present in this case may be the same or different.

The divalent connecting group represented by L is preferably an oxy group —O—, thio group —S—, carbonyl group —CO—, sulfonyl group —$SO_2$—, imino group —NH—, methylene group —$CH_2$—, or a group formed by combining these.

In the aforementioned general formula (I), the molecular weight of the phthalocyanine compound is preferably in the range of 750 to 3000, and more preferably a molecular weight in the range of 995 to 2500; and in that range, a molecular weight in the range of 995 to 2000 is more preferable, most preferably in the range of 995 to 1800.

If in the phthalocyanine compound represented by the general formula (I) Pc (phthalocyanine ring) forms a dimer (for example, Pc-M-L-M-Pc) or trimer via L (divalent connecting group), the preferred molecular weight, for example, the most preferable molecular weight would be two times (if a dimer) or 3 times (if a trimer) the most preferable molecular weight (in the range of 995-1800) described above. Here, the preferred molecular weight of the aforementioned dimer or trimer is the value comprising the connecting group L.

In the phthalocyanine compound represented in the general formula (I), at least one of $X_1$, $X_2$, $X_3$, $X_4$, $Y_1$, $Y_2$, $Y_3$, and $Y_4$ is an ionic hydrophilic group or is a group having an ionic hydrophilic group as a substituent.

Ionic hydrophilic groups as substituents include sulfone group (—$SO_3^-X^+$), carboxyl group (—$CO_2^-X^+$), quaternary ammonium group (—$N^+RR'R''X^-$), acylsulfamoyl group (—$SO_2N^+X^-COR$), sulfonylcarbamoyl group (—$CON^+X^-SO_2R$), and sulfonylsulfamoyl group (—$SO_2N^+X^-SO_2R$), etc. Sulfone group, carboxyl group and quaternary ammonium group are preferable, and sulfone group is most preferable. Sulfone group, carboxyl group, acylsulfamoyl group, sulfonylcarbamoyl group and sulfonylsulfamoyl group may be a salt,. and examples of counter-ions to form the salts include alkali metal ions (for example, sodium ion, potassium ion, and lithium ion), ammonium ions, organic cations (for example, tetramethylguanidinium ion), and organic and/or inorganic anions (for example, halogen ions, methanesulfonate ion, benzenesulfonate ion). Further, the X in the parenthesis above represents a hydrogen atom or a counter-ion, and R, R', R" represent substituents.

In the phthalocyanine compound represented in the general formula (I), at least one ionic hydrophilic group or group having an ionic hydrophilic group as a substituent is present in one molecule, and therefore, the solubility or dispersion characteristics in an aqueous medium are satisfactory. From this standpoint, having at least 2 ionic hydrophilic groups in one molecule is preferable as a phthalocyanine compound represented by the general formula (I); having at least one of several ionic hydrophilic groups be a sulfone group is more preferable; and among these, having at least 2 sulfone groups in one molecule is most preferable.

The more preferable compounds as the phthalocyanine compound represented by the aforementioned general formula (I) are compounds having a combination of (a) to (f) below.

(a) $X_1$ to $X_4$ each independently is preferably —$SO_2$-Z.

(b) Z each independently is a substituted or unsubstituted alkyl group, substituted or unsubstituted aryl group, or substituted or unsubstituted heterocyclic group; among these, preferably a substituted alkyl group, substituted aryl group, or substituted heterocyclic group; and most preferably a substituted alkyl group.

(c) $Y_1$ to $Y_4$ each independently is preferably is a hydrogen atom, halogen atom, alkyl group, aryl group, cyano group, alkoxy group, amide group, ureide group, sulfonamide group, carbamoyl group, sulfamoyl group, alkoxycarbonyl group, carboxyl group, or sulfone group; more preferably a hydrogen atom, halogen atom, cyano group, carboxyl group or sulfone group; and most preferably a hydrogen atom.

(d) $a_1$ to $a_4$ each independently is preferably 1 or 2, and more preferably 1. $b_1$ to $b_4$ each independently is preferably 3 or 2, and more preferably 3.

(e) M is preferably Cu, Ni, Zn, or Al, and among these, Cu is most preferable.

(f) The molecular weight of the phthalocyanine compound is preferably in the range of 750 to 3000, and more preferably a molecular weight in the range of 995 to 2500; and in that range, a molecular weight in the range of 995 to 2000 is more preferable, most preferably in the range of 995 to 1800.

When combining the preferable substituents of the compound represented in the aforementioned general formula (I), a compound in which at least one of the various substituents is a previously described preferred group is preferable; a compound in which more of the various substituents are previously described preferred groups is more preferable; a compound in which all of the substituents are previously described preferred groups is most preferable.

Of the phthalocyanine compounds represented by the general formula (I), the phthalocyanine compounds with the structure represented by the following general formula (III) is more preferable. The phthalocyanine compound represented by the general formula (III) that is suitably used in the present invention will be described in detail below.

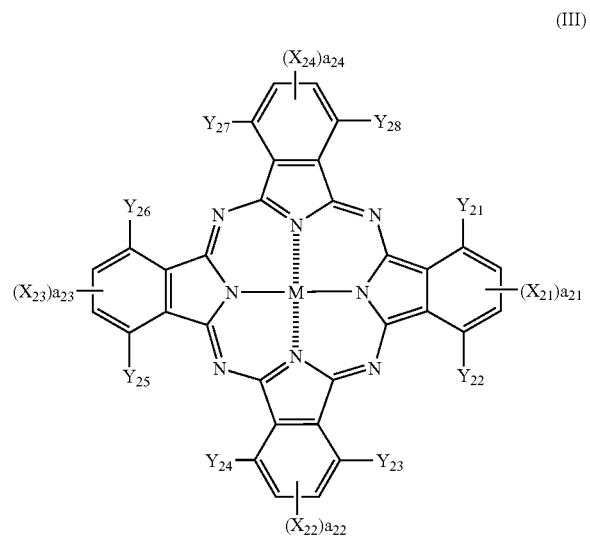

(III)

In the aforementioned general formula (III), $X_{21}$, $X_{22}$, $X_{23}$, $X_{24}$ each individually represents either —SO-Z or —$SO_2$-Z, and —$SO_2$-Z is more preferable.

Z is the same as Z in the general formula (I), and the more preferable examples are the same.

$Y_{21}$ to $Y_{28}$ each independently is the same as $Y_1$, $Y_2$, $Y_3$, and $Y_4$ respectively in the general formula (I), and the preferable examples are also the same.

$a_{21}$ to $a_{24}$ satisfy $4 \leq a_{21}+a_{22}+a_{23}+a_{24} \leq 8$, preferably $4 \leq a_{21}+a_{22}+a_{23}+a_{24} \leq 6$; and each independently represents an integer of 1 or 2. More preferably, $a_{21}=a_{22}=a_{23}=a_{24}=1$.

M is the same as M in the aforementioned general formula (I).

At least one of $X_{21}$, $X_{22}$, $X_{23}$, $X_{24}$, $Y_{21}$, $Y_{22}$, $Y_{23}$, $Y_{24}$, $Y_{25}$, $Y_{26}$, $Y_{27}$, and $Y_{28}$ is an ionic hydrophilic group or a group having an ionic hydrophilic group as a substituent.

The examples of ionic hydrophilic groups are the same as the examples of $X_1$, $X_2$, $X_3$, and $X_4$ in the general formula (I), and the preferable examples are also the same.

In the phthalocyanine compound represented in the general formula (III) at least one ionic hydrophilic group or group having an ionic hydrophilic group as a substituent is present in one molecule, and therefore, the solubility or dispersion characteristics in an aqueous medium are satisfactory. From this standpoint, having at least 2 ionic hydrophilic groups in one molecule is preferable as a phthalocyanine compound represented by the general formula (III); having at least one of several ionic hydrophilic groups be a sulfone group is more preferable; and among these, having at least 2 sulfone groups in one molecule is most preferable.

In the aforementioned general formula (III), the molecular weight of the phthalocyanine compound is preferably in the range of 750 to 3000, and more preferably a molecular weight in the range of 995 to 2500; and in that range, a molecular weight in the range of 995 to 2000 is more preferable, most preferably in the range of 995 to 1800.

However, if in the phthalocyanine compound represented by the general formula (III) Pc (phthalocyanine ring) forms a dimer (for example, Pc-M-L-M-Pc) or trimer via L (divalent connecting group), the preferred molecular weight, for example, the most preferable molecular weight would be two times (if a dimer) or 3 times (if a trimer) the most preferable molecular weight (in the range of 995-1800) described above. Here, the preferred molecular weight of the aforementioned dimer or trimer is the value comprising the connecting group L.

The more preferable compounds as the phthalocyanine compound represented by the aforementioned general formula (III) are compounds having a combination of (a) to (f) below.

(a) $X_{21}$ to $X_{24}$ each independently is preferably —$SO_2$-Z.

(b) Z each independently is a substituted or unsubstituted alkyl group, substituted or unsubstituted aryl group, or substituted or unsubstituted heterocyclic group; among these, preferably a substituted alkyl group, substituted aryl group, or substituted heterocyclic group; and most preferably a substituted alkyl group.

(c) $Y_{21}$ to $Y_{28}$ each independently is preferably is a hydrogen atom, halogen atom, alkyl group, aryl group, cyano group, alkoxy group, amide group, ureide group, sulfonamide group, carbamoyl group, sulfamoyl group, alkoxycarbonyl group, carboxyl group, or sulfone group; more preferably a hydrogen atom, halogen atom, cyano group, carboxyl group or sulfone group; and most preferably a hydrogen atom.

(d) $a_{11}$ to $a_{14}$ each independently is preferably 1 or 2. More preferably, $a_{11}=a_{12}=a_{13}=a_{14}=1$.

(e) M is preferably Cu, Ni, Zn, or Al, and among these, Cu is most preferable.

(f) The molecular weight of the phthalocyanine compound is preferably in the range of 750 to 2500, and more preferably a molecular weight in the range of 995 to 2500; and in that range, a molecular weight in the range of 995 to 2000 is more preferable, most preferably in the range of 995 to 1800.

When combining the preferable substituents of the compound represented in the aforementioned general formula (III), a compound in which at least one of the various substituents is a previously described preferred group is preferable; a compound in which more of the various substituents are previously described preferred groups is more preferable; a compound in which all of the substituents are previously described preferred groups is most preferable.

Of the phthalocyanine compounds represented by the general formula (III), the phthalocyanine compounds with the structure represented by the following general formula (IV) is more preferable. The phthalocyanine compound represented by the general formula (IV) that is suitably used in the present invention will be described in detail below.

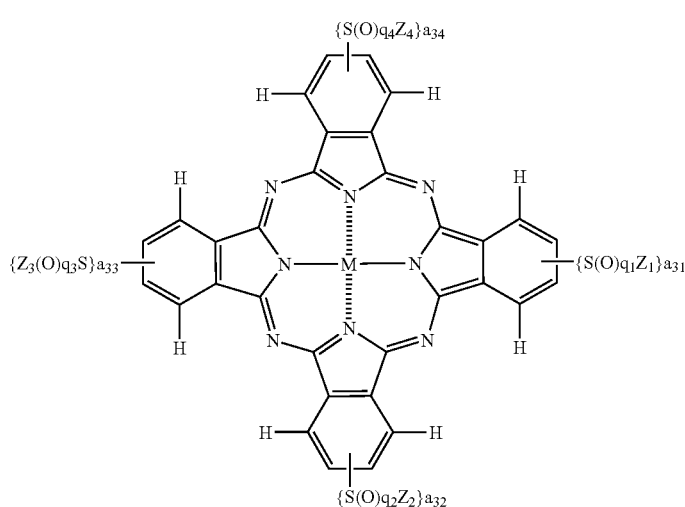

(IV)

In the general formula (IV), $Z_1$, $Z_2$, $Z_3$, and $Z_4$ each individually is the same as Z in the general formula (I), and the preferable examples are also the same.

$q_1$, $q_2$, $q_3$, and $q_4$ each independently represents an integer of 1 or 2; and 2 is preferable. Among these, most preferable is $q_1=q_2=q_3=q_4=2$.

$a_{31}$, $a_{32}$, $a_{33}$, and $a_{34}$ each independently represents an integer of 1 or 2; and 1 is preferable. Among these, most preferable is $a_{31}=a_{32}=a_{33}=a_{34}=1$.

M is the same as M in the aforementioned general formula (I).

At least one of $Z_1$, $Z_2$, $Z_3$, and $Z_4$ has an ionic hydrophilic group as a substituent.

The examples of ionic hydrophilic groups are the same as the examples of Z in the aforementioned general formula (I), and the preferable examples are also the same.

The molecular weight of the phthalocyanine compound is preferably in the range of 750 to 2500, and more preferably a molecular weight in the range of 995 to 2500; and in that range, a molecular weight in the range of 995 to 2000 is more preferable, most preferably in the range of 995 to 1800.

Among the compounds represented by the general formula (I) used in this invention, the compounds represented by the following general formula (II) are more preferable.

(II)

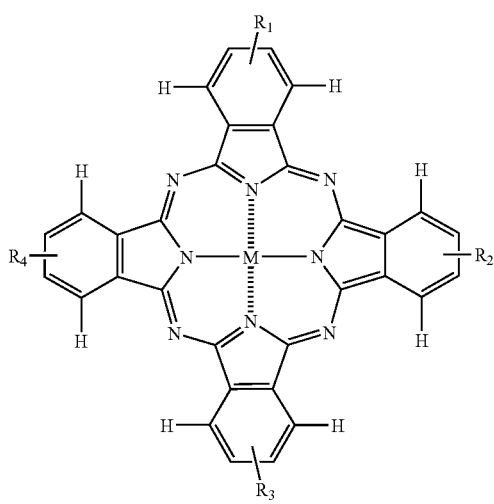

In the formula, M has the same meaning as in the general formula (I), and $R_1$ to $R_4$ each independently represent $SO_2Z$. Z has the same meaning as Z in the general formula (I), and the preferable examples are also the same. However, at least one of the 4 Z has an ionic hydrophilic group as a substituent.

Among the above compounds, a compound, in which the M in the general formula (II) is the element copper and the Z having an ionic hydrophilic group as a substituent is a sulfoalkyl group, is more preferable; and a compound, in which the sulfone group is a salt and the counter-cation forming the salt is lithium cation, is even more preferable.

The phthalocyanine compound represented by the general formula (V) below that can be used in the present invention is synthesized, for example, by allowing the phthalonitrile compound represented by the following general formula (VI) and/or the diiminoisoindoline derivative represented by the following general formula (VII) to react with the metal derivative represented by M-(Y)d. Further, in the formula, Z and $Z_1$ to $Z_4$ have the same meaning as Z in the general formula (I); and M has the same meaning as M in the general formula (I). Y indicates monovalent or divalent ligands such as a halogen atom, acetate negative ion, acetilacetonate, or oxygen, etc., and d is an integer of 1 to 4. Metal derivatives represented by M-(Y)d include Al, Si, Ti, V, Mn, Fe, Co, Ni, Cu, Zn, Ge, Ru, Rh, Pd, In, Sn, Pt, halide of Pb, carbonate derivative, sulfate salt, nitrate salt, carbonyl compounds, oxides, and complexes. Specific examples include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, manganese acetylacetone, manganese chloride, lead chloride, lead acetate, indium chloride, titanium chloride, and tin chloride.

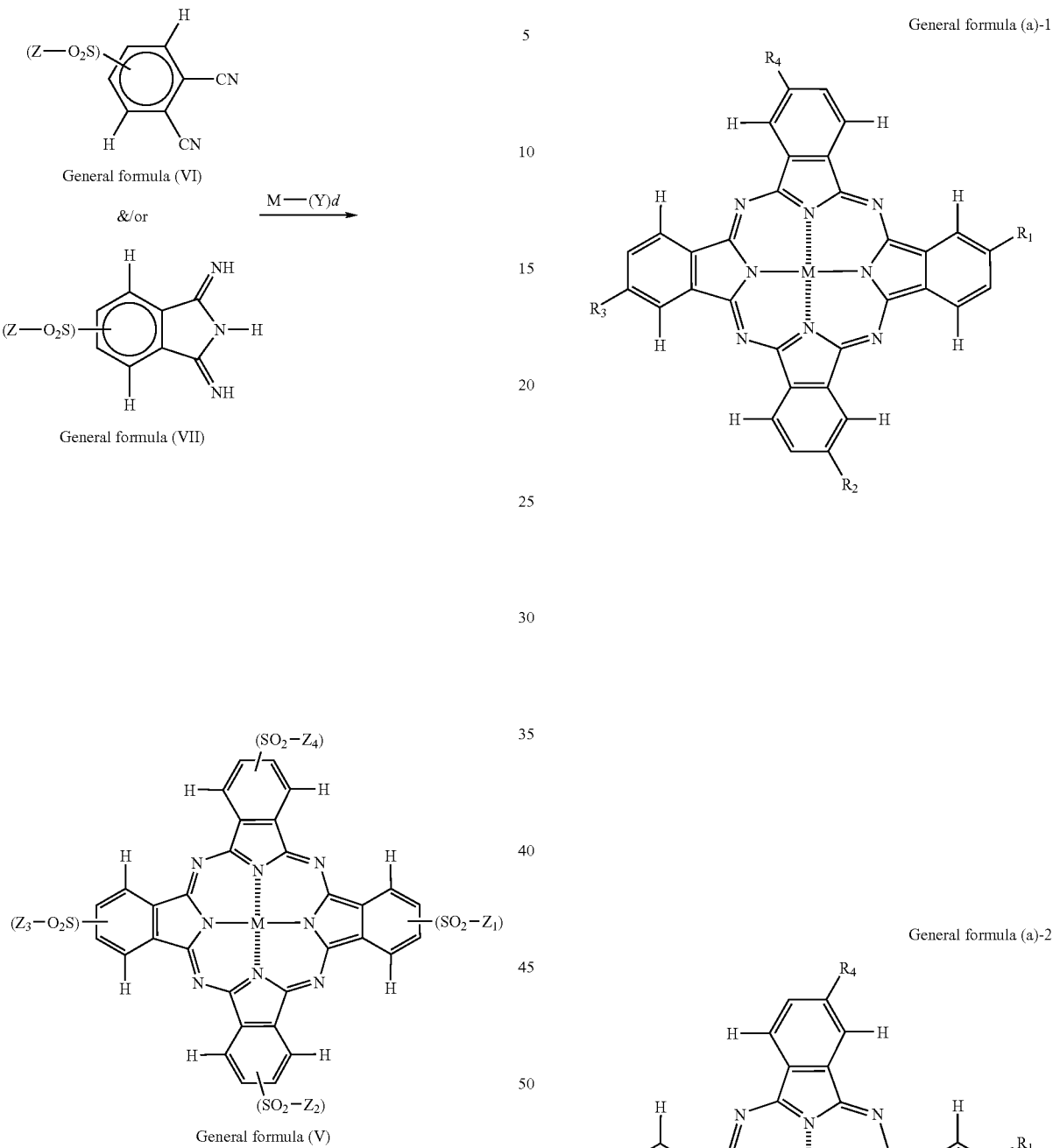

General formula (VI)

&/or

General formula (VII)

General formula (V)

General formula (a)-1

General formula (a)-2

The compounds represented in the aforementioned general formula (V) obtained in this way normally are a mixture of the compounds expressed by the following general formulae (a)-1 to (a)-4, which are isomers in various substitution positions of $R_1$ ($SO_2$-$Z_1$), $R_2$ ($SO_2$-$Z_2$), $R_3$ ($SO_2$-$Z_3$), and $R_4$ ($SO_2$-$Z_4$).

Further, if using the general formula (VI) and/or the general formula (VII) having 2 or more differing kinds of substituents to adjust the dye, the compound represented by the general formula (V) is a dye mixture of differing substituent types and positins.

General formula (a)-3

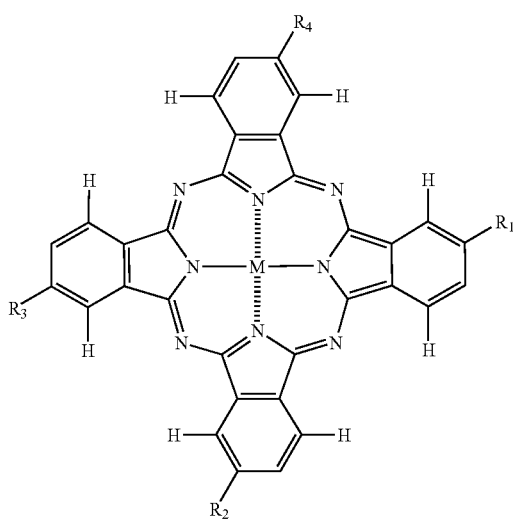

General formula (a)-4

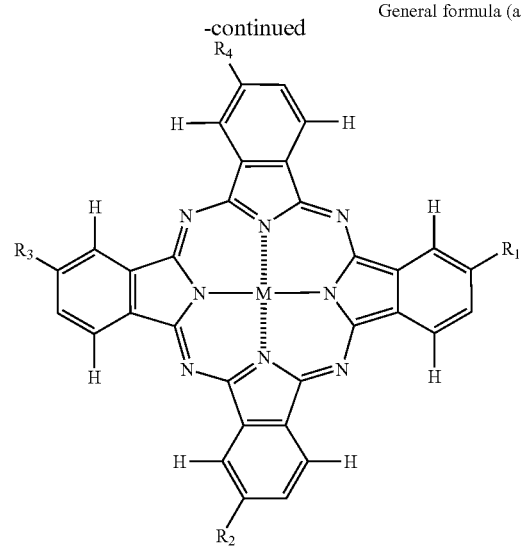

The compounds with related structures described in Japan Laid-Open Patent Application Nos. 2002-249677, 2003-213167, 2003-213168, and 2004-2670 may be cited as examples of cyano dyes to be used in the present invention, and those listed in the following table are more preferable. The compounds listed in Table 1 and Table 2 may be synthesized using the methods described in the above publications. Of course, the departure compounds, color intermediates and synthesis methods are not limited to these.

TABLE 1

In general formula (V)

| | M | $Z_1$ | $Z_2$ | $Z_3$ | $Z_4$ |
|---|---|---|---|---|---|
| Compound A | Cu | —$(CH_2)_3SO_3Na$ | —$(CH_2)_3SO_3Na$ | —$(CH_2)_3SO_3Na$ | —$(CH_2)_3SO_3Na$ |
| Compound B | Cu | —$(CH_2)_3SO_3Li$ | —$(CH_2)_3SO_3Li$ | —$(CH_2)_3SO_3Li$ | —$(CH_2)_3SO_3Li$ |
| Compound C | Cu | —$(CH_2)_3CO_2K$ | —$(CH_2)_3CO_2K$ | —$(CH_2)_3CO_2K$ | —$(CH_2)_3CO_2K$ |
| Compound D | Cu | —$CH_2CH(OH)CH_2SO_3Li$ | —$CH_2CH(OH)CH_2SO_3Li$ | —$CH_2CH(OH)CH_2SO_3Li$ | —$CH_2CH(OH)CH_2SO_3Li$ |
| Compound E | Cu | —$(CH_2)_2CH(CH_3)SO_3Li$ | —$(CH_2)_2CH(CH_3)SO_3Li$ | —$(CH_2)_2CH(CH_3)SO_3Li$ | —$(CH_2)_2CH(CH_3)SO_3Li$ |

TABLE 2

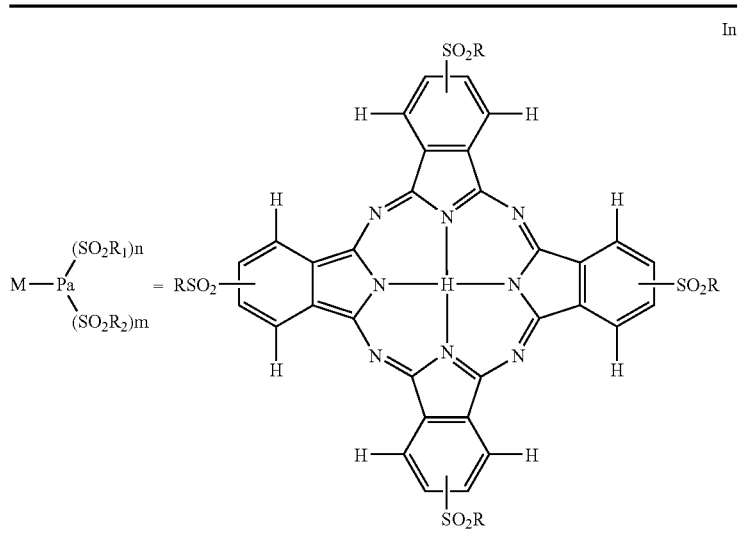

| | M | $R_1$ | n | $R_2$ | m |
|---|---|---|---|---|---|
| Compound F | Cu | —$(CH_2)_3SO_3Li$ | 3 | —$(CH_2)_3SO_2NHCH_2CH(OH)CH_3$ | 1 |
| Compound G | Cu | —$(CH_2)_3SO_3Li$ | 2 | —$(CH_2)_3SO_2NHCH_2CH(OH)CH_3$ | 2 |

TABLE 2-continued $$M-Pa \begin{matrix} (SO_2R_1)n \\ (SO_2R_2)m \end{matrix} = \text{[phthalocyanine structure with } RSO_2, SO_2R \text{ substituents]}$$

|  | M | $R_1$ | n | $R_2$ | m |
|---|---|---|---|---|---|
| Compound H | Cu | —(CH$_2$)$_3$SO$_3$Li | 3 | —(CH$_2$)$_3$SO$_2$NHCH(CH$_3$)CH$_2$OH | 1 |
| Compound I | Cu | —(CH$_2$)$_3$SO$_3$Li | 2 | —(CH$_2$)$_3$SO$_2$NHCH(CH$_3$)CH$_2$OH | 2 |
| Compound J | Cu | —(CH$_2$)$_3$SO$_3$Li | 3 | —(CH$_2$)$_3$SO$_2$N(C$_2$H$_4$OH)$_2$ | 1 |
| Compound K | Cu | —(CH$_2$)$_3$SO$_3$Li | 3 | —(CH$_2$)$_5$CO$_2$Li | 1 |

In the table, the position and order of entering the substituents (SO$_2$R$_1$) and (SO$_2$R$_2$) are not the same.
(Expresses the isomers represented by (a)-1 to (a)-4 described above.)

The values of m and n are the incorporated mole ratios of the phthalonitrile derivatives used when synthesizing the phthalocyanine derivatives.

The dye content is determined by the type of compound expressed by the general formula (I) and the type of solvent component, etc, but the range of 0.1 to 10 weight % in relation to the total weight of the ink composition is preferable, a range of 0.5 to 5 weight % is more preferable. By making the weight % 0.1 or more, the color characteristics in the recording medium or image concentration can be guaranteed, and by making the weight % 10 or less, the viscosity of the ink composition is easy to adjust, and such characteristics as the discharge reliability and clogging characteristics can be easily guaranteed.

The ink composition of the present invention contains one or more kinds of aromatic compounds and/or the salts thereof having a specified sulfone group in order to control fading (phenomena caused by the phthalocyanine group cyan dye having inferior gas fastness, ozone fastness in particular) observed when solid printing using the ink composition containing the aforementioned phthalocyanine group cyan dye.

The present invention by combining the aromatic compounds and or the salts thereof having the specified sulfone group with the phthalocyanine group cyan dye indicated in the aforementioned general formula I prevents fading of images deriving from ozone gas, and dramatically improves the anti-fading characteristics of the image.

In addition, in the present invention, if the ink composition contains water, the aforementioned phthalocyanine group cyan dye, and at least one or more kinds of aromatic compounds and/or the salts thereof having a specified sulfone group, naturally the ink composition, even if for example an ink composition of a color different than cyan such as a black ink composition, can effectively prevent the fading observed with solid printing. Joint use with other dyes well known in the past is possible in order to produce these kinds of ink compositions.

Moreover, the ink composition of the present invention is comprised of, as previously described, at least water, a phthalocyanine group cyan dye indicated by the aforementioned general formula (VIII), and an aromatic compound having a sulfone group and/or the salt thereof represented by the aforementioned general formula (a) and/or (b).

The cyan dye used in the ink composition of the present invention, specifically, the phthalocyanine group cyan dye indicated by the general formula (VIII) below, will be described in detail.

(VIII)

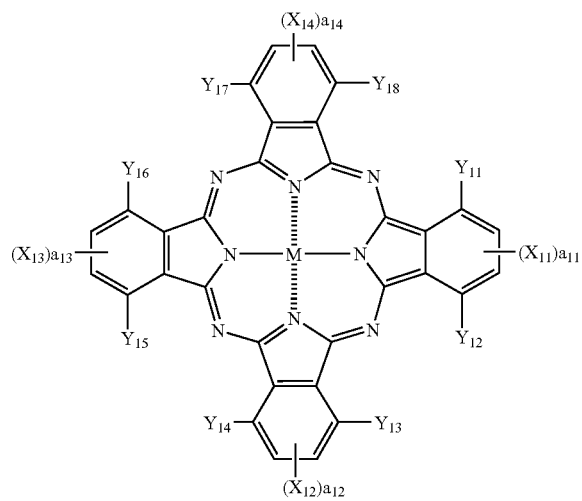

In the aforementioned general formula (VIII), $X_{11}$, $X_{12}$, $X_{13}$, $X_{14}$ each individually represent —$SO_2NR_1R_2$ or a sulfone group, and —$SO_2NR_1R_2$ is preferable. However, not all of $X_{11}$, $X_{12}$, $X_{13}$, $X_{14}$ may be a sulfone group at the same time. $R_1$ and $R_2$ may be mutually bound, and may form a nitrogen heterocycle of 5 to 6 members.

$R_1$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group. In particular, a hydrogen atom, substituted or unsubstituted alkyl group, substituted or unsubstituted aryl group, and substituted or unsubstituted heterocyclic group are preferable; among these, a hydrogen atom, substituted alkyl group, substituted aryl group, or substituted heterocyclic group are more preferable; and further, hydrogen atom, substituted alkyl group and substituted aryl group are preferred, with substituted hydrogen atom being the most preferred.

$R_2$ each independently represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group. Among these, substituted or unsubstituted alkyl group, substituted or unsubstituted aryl group, and substituted or unsubstituted heterocyclic group are preferable; and substituted alkyl group, substituted aryl group, or substituted heterocyclic group are more preferable; further, substituted alkyl group and substituted aryl group are preferred, with substituted alkyl group being the most preferred.

The substituted or unsubstituted alkyl groups that $R_1$ and $R_2$ represent are preferably alkyl groups having 1 to 30 carbon atoms. Examples of substituents include the same substituents as when the previously described $R_1$, $R_2$, $Y_{11}$, $Y_{12}$, $Y_{13}$, $Y_{14}$, $Y_{15}$, $Y_{16}$, $Y_{17}$, and $Y_{18}$ can have further substituents.

The substituted or unsubstituted cycloalkyl groups that $R_1$ and $R_2$ represent are preferably cycloalkyl groups having 5 to 30 carbon atoms. Examples of substituents include the same substituents as when the previously described $R_1$, $R_2$, $Y_{11}$, $Y_{12}$, $Y_{13}$, $Y_{14}$, $Y_{15}$, $Y_{16}$, $Y_{17}$, and $Y_{18}$ can have further substituents.

The substituted or unsubstituted alkenyl groups that $R_1$ and $R_2$ represent are preferably alkenyl groups having 2 to 30 carbon atoms. Examples of substituents include the same substituents as when the previously described $R_1$, $R_2$, $Y_{11}$, $Y_{12}$, $Y_{13}$, $Y_{14}$, $Y_{15}$, $Y_{16}$, $Y_{17}$, and $Y_{18}$ can have further substituents.

The substituted or unsubstituted aralkyl groups that $R_1$ and $R_2$ represent are preferably aralkyl groups having 7 to 30 carbon atoms. Examples of substituents include the same substituents as when the previously described $R_1$, $R_2$, $Y_{11}$, $Y_{12}$, $Y_{13}$, $Y_{14}$, $Y_{15}$, $Y_{16}$, $Y_{17}$, and $Y_{18}$ can have further substituents.

The substituted or unsubstituted aryl groups that $R_1$ and $R_2$ represent are preferably aryl groups having 6 to 30 carbon atoms. Examples of substituents include the same substituents as when the previously described $R_1$, $R_2$, $Y_{11}$, $Y_{12}$, $Y_{13}$, $Y_{14}$, $Y_{15}$, $Y_{16}$, $Y_{17}$, and $Y_{18}$ can have further substituents.

The heterocyclic groups that $R_1$ and $R_2$ represent preferably have 5 or 6 member rings, and these may be further annelated. Moreover, the heterocycles may be aromatic or non-aromatic. Examples of the heterocyclic groups represented by $R_1$ and $R_2$ are given below in the form of a heterocycle with the substitution position omitted, but the substitution position is not limited, and if pyridine, for example, may be substituted at positions 2, 3, 4. Examples include: pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperazine, imidizolidine, and thiazoline. Among them, aromatic heterocyclic groups are preferable, and preferable examples thereof include, as described above, pyridine, pyrazine, pyrimidine, pyridazine, triazine, pyrazole, imidazole, benzimidazole, triazole, thiazole, benzothiazole, isothiazole, benzisothiazole, thiadiazole.

These may have substituents, and examples of substituents are the same as substituents when $R_1$, $R_2$, $Y_{11}$, $Y_{12}$, $Y_{13}$, $Y_{14}$, $Y_{15}$, $Y_{16}$, $Y_{17}$, and $Y_{18}$ can further have a substituent as described later.

$Y_{11}$, $Y_{12}$, $Y_{13}$, $Y_{14}$, $Y_{15}$, $Y_{16}$, $Y_{17}$, and $Y_{18}$ each independently represents a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureide group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group, or sulfone group; and these various groups may have substituents.

Among them, a hydrogen atom, halogen atom, alkyl group, aryl group, cyano group, alkoxy group, amide group, ureide group, sulfonamide group, carbamoyl group, alkoxycarbonyl group, carboxyl group, and sulfone group are preferable, and particularly, a hydrogen atom, halogen atom and cyano group, carboxyl group and sulfone group are preferable, and a hydrogen atom is most preferable.

If $R_1$, $R_2$, $Y_{11}$, $Y_{12}$, $Y_{13}$, $Y_{14}$, $Y_{15}$, $Y_{16}$, $Y_{17}$, or $Y_{18}$ is a group capable of further carrying substituents, the substituents described below may further be carried.

Examples include: halogen atoms (for example, chlorine atom, bromine atom), linear or branched alkyl groups having 1 to 12 carbon atoms, aralkyl groups having 7 to 18 carbon atoms, alkenyl groups having 2 to 12 carbon atoms, linear or branched alkynyl groups having 2 to 12 carbon atoms, cycloalkyl groups having 3 to 12 carbon atoms that may have side chains, cycloalkenyl groups having 3 to 12 carbon atoms that may have side chains, (more specifically, for example, methyl, ethyl, propyl, isopropyl, t-butyl, 2-methylsulfonylethyl, 3-phenoxypropyl, trifluoromethyl, cyclopentyl), aryl groups (for example, phenyl, 4-t-butylphenyl, 2,4-di-t-amylphenyl), heterocyclic groups (for example, imidazolyl, pyrazolyl, triazolyl, 2-furyl, 2-thienyl, 2-pyrimidinyl, 2-benzothiazolyl), alkyloxy groups (for example, methoxy, ethoxy, 2-methoxyethoxy, 2-methylsulfonylethoxy), aryloxy groups (for example, phenoxy, 2-methylphenoxy, 4-t-butylphenoxy, 3-nitrophenoxy, 3-t-butyloxycarbonylphenoxy, 3-methoxycarbonylphenoxy), acylamino groups (for example, acetamide, benzamide, 4-(3-t-butyl-4-hydroxyphenoxy)butanamide), alkylamino groups (for example, methylamino, butylamino, diethylamino, methylbutylamino), anilino groups (for example, phenylamino, 2-chloroanilino), ureide groups (for example, phenylureide, methylureide, N,N-dibutylureide), sulfamoylamino groups (for example, N,N-dipropylsulfamoylamino), alkylthio groups (for example, methylthio, octylthio, 2-phenoxyethylthio), arylthio groups (for example, phenylthio, 2-butoxy-5-t-octylphenylthio, 2-carbbxyphenylthio), alkyloxycarbonylamino groups (for example, methoxycarbonylamino), sulfonamide groups (for example, methanesulfonamide, benzenesulfonamide, p-toluenesulfonamide), carbamolyl groups (for example, N-ethylcarbamoyl, N,N-dibutylcarbamoyl), sulfamolyl groups (for example, N-ethylsulfamoyl, N,N-dipropylsulfamoyl, N,N-diethylsulfamoyl), sulfonyl groups (for example, methylsulfonyl, octylsulfonyl, phenylsulfonyl, 4-methylphenylsulfonyl), alkyloxycarbonyl groups (for example, methoxycarbonyl, butyloxycarbonyl), heterocyclic oxy groups (for example, 1-phenyltetrazole-5-oxy, 2-tetrahydropyranyloxy), azo groups (for example, phenylazo, 4-methoxyphenylazo, 4-pivaloylaminophenylazo, 2-hydroxy-4-propanoylphenylazo), acyloxy groups (for example, acetoxy), carbamoyloxy groups (for example, N-methylcarbamoyloxy, N-phenylcarbamoyloxy), silyloxy groups (for example, trimethylsilyloxy, dibutylmethylsilyloxy), aryloxycarbonylamino groups (for example, phenoxycarbonylamino), imide groups (for example, N-succinimide, N-phthalimide), heterocyclic thio groups (for example, 2-benzothiazolylthio, 2,4-di-phenoxy-1,3,5-triazole-6-thio, 2-pyridylthio), sulfinyl groups (for example, 3-phenoxypropylsulfinyl), phosphonyl groups (for example, phenoxyphosphonyl, octyloxyphosphonyl, phenylphosphonyl), aryloxycarbonyl groups (for example, phenoxycarbonyl), acyl groups (for example, acetyl, 3-phenylpropanoyl, benzoyl), ionic hydrophilic groups (for example, carboxyl group, sulfone group, quaternary ammonium group, sulfonylsulfamoyl group, and acylsulfamoyl group), and other cyano groups, hydroxy groups, nitro groups, and amino groups. Among these substituents, hydroxy groups, alkoxy groups, sulfamoyl groups, sulfonamide groups, acylamino groups, carbamoyl groups, cyano groups, and ionic hydrophilic groups are preferred, and among these, hydroxy groups, sulfamoyl groups and ionic hydrophilic groups are more preferable.

In the general formula (VIII), $a_{11}$ to $a_{14}$ represent substituents of $X_{11}$ to $X_{14}$ respectively, and each independently represents an integer of 0 to 2. However, $a_{11}$ to $a_{14}$ may not all be 0 at the same time. In particular, it is preferable that $a_{11}$ to $a_{14}$ be 1 respectively.

M represents a hydrogen atom, metal element, metal oxide, metal hydroxide or metal halide.

Other than a hydrogen atom, preferable examples of M as a metal atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. Preferable examples of oxides include VO and GeO. Preferable examples of hydroxides include $Si(OH)_2$, $Cr(OH)_2$ and $Sn(OH)_2$. Further, examples of halides include AlCl, $SiCl_2$, VCl, $VCl_2$, VOCl, FeCl, GaCl and ZrCl. Among them, particularly, Cu, Ni, Zn, Al, etc. are preferable, and Cu is most preferable.

Moreover, in the phthalocyanine compound represented by the general formula (VIII), Pc (phthalocyanine ring) may form a dimer (for example, Pc-M-L-M-Pc) or trimer via L (divalent connecting group), and the plurality of Ms present in this case may be the same or different.

The divalent connecting group represented by L is preferably an oxy group —O—, thio group —S—, carbonyl group —CO—, sulfonyl group —SO$_2$—, imino group —NH—, methylene group —CH$_2$—, or a group formed by combining these.

In the aforementioned general formula (VIII), the molecular weight of the phthalocyanine compound is preferably in the range of 750 to 3000, and more preferably a molecular weight in the range of 995 to 2500; and in that range, a molecular weight in the range of 995 to 2000 is more preferable, most preferably in the range of 995 to 1800.

If in the phthalocyanine compound represented by the general formula (VIII), Pc (phthalocyanine ring) forms a dimer (for example, Pc-M-L-M-Pc) or trimer via L (divalent connecting group), the preferred molecular weight, for example, the most preferable molecular weight would be two times (if a dimer) or 3 times (if a trimer) the most preferable molecular weight (in the range of 995-1800) described above. Here, the preferred molecular weight of the aforementioned dimer or trimer is the value comprising the connecting group L.

In the phthalocyanine compound represented in the general formula (VIII), at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$, and $Y_{18}$ is an ionic hydrophilic group or is a group having an ionic hydrophilic group as a substituent.

Ionic hydrophilic groups as substituents include sulfone group ($—SO_3^-X^+$), carboxyl group ($—CO_2^-X^+$), quaternary ammonium group ($—N^+RR'R''X^-$), acylsulfamoyl group ($—SO_2N^+X^-COR$), sulfonylcarbamoyl group ($—CON^+X^-SO_2R$), and sulfonylsulfamoyl group ($—SO_2N^+X^-SO_2R$), etc. Sulfone group, carboxyl group and quaternary ammonium group are preferable, and sulfone group is most preferable. Sulfone group, carboxyl group, acylsulfamoyl group, sulfonylcarbamoyl group and sulfonylsulfamoyl group may be a salt, and examples of counter-ions to form the salts include alkali metal ions (for example, sodium ion, potassium ion, and lithium ion), ammonium ions, organic cations (for example, tetramethylguanidinium ion), and organic and/or inorganic anions (for example, halogen ion, methanesulfonate ion, benzenesulfonate ion). Further, the X in the parenthesis above represents a hydrogen atom or a counter-ion, and R, R', R" represent substituents.

In the phthalocyanine compound represented in the general formula (VIII) at least one ionic hydrophilic group or group having an ionic hydrophilic group as a substituent is present in one molecule, and therefore, the solubility or dispersion characteristics in an aqueous medium are satisfactory. From this standpoint, having at least 2 ionic hydrophilic groups in one molecule is preferable as a phthalocyanine compound represented by the general formula (VIII); having at least one of several ionic hydrophilic groups be a sulfone group is more preferable; and among these, having at least 2 sulfone groups in one molecule is most preferable.

The more preferable compounds as the phthalocyanine compound represented by the general formula (VIII) are compounds having a combination of (a) to (g) below.

(a) $X_{11}$ to $X_{14}$ each independently is preferably $—SO_2NR_1R_2$.

(b) $R_1$ is preferably a hydrogen atom, substituted or unsubstituted alkyl group, substituted or unsubstituted aryl group, or substituted or unsubstituted heterocyclic group; among these, preferably a hydrogen atom, substituted alkyl group, substituted aryl group, or substituted heterocyclic group; and most preferably a hydrogen atom.

(c) $R_2$ is preferably a substituted or unsubstituted alkyl group, substituted or unsubstituted aryl group, or substituted or unsubstituted heterocyclic group; among these, preferably a substituted alkyl group, substituted aryl group, or substituted heterocyclic group; and most preferably a substituted alkyl group. Further, even more preferable is that at least one of $R_1$ and $R_2$ be an ionic hydrophilic group or a group having an ionic hydrophilic substituent.

(d) $Y_{11}$ to $Y_{18}$ each independently is preferably a hydrogen atom, halogen atom, alkyl group, aryl group, cyano group, alkoxy group, amide group, ureide group, sulfonamide group, carbamoyl group, sulfamoyl group, alkoxycarbonyl group, carboxyl group, or sulfone group; more preferably a hydrogen atom, halogen atom, cyano group, carboxyl group or sulfone group; and most preferably a hydrogen atom.

(e) $a_{11}$ to $a_{14}$ each is preferably 1.

(f) M is preferably Cu, Ni, Zn, or Al, and among these, Cu is most preferable.

(g) The molecular weight of the phthalocyanine compound is preferably in the range of 750 to 3000, and more preferably a molecular weight in the range of 995 to 2500; and in that range, a molecular weight in the range of 995 to 2000 is more preferable, most preferably in the range of 995 to 1800.

When combining the preferable substituents of the compound represented in the aforementioned general formula (VIII), a compound in which at least one of the various substituents is a previously described preferred group is preferable; a compound in which more of the various substituents are previously described preferred groups is more preferable; a compound in which all of the substituents are previously described preferred groups is most preferable.

Of the phthalocyanine compounds represented by the general formula (VIII), the phthalocyanine compounds with the structure represented by the following general formula (IX) are more preferable. The phthalocyanine compound represented by the general formula (IX) that is suitably used in the present invention will be described in detail below.

General Formula (IX)

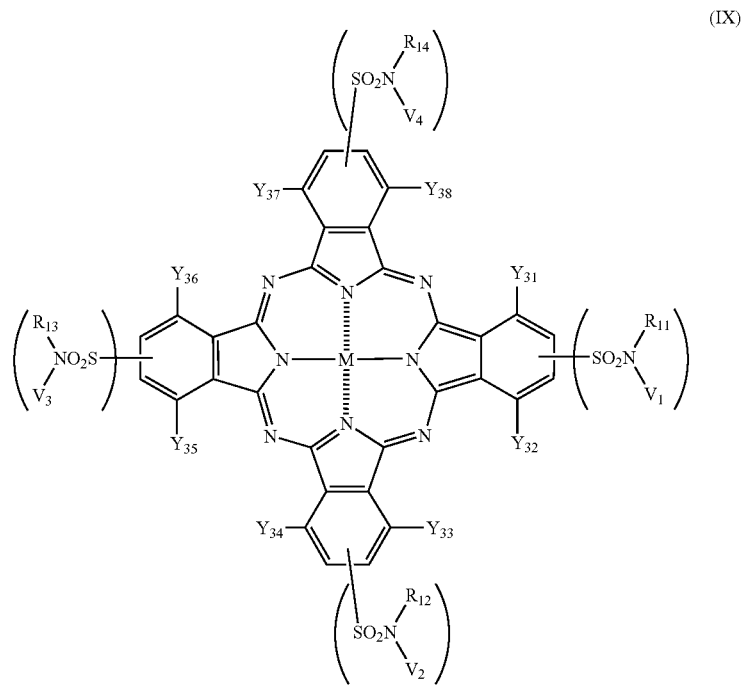

(IX)

In the aforementioned general formula (IX), $R_{11}$, $R_{12}$, $R_{13}$, and $R_{14}$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group.

The preferable examples of $R_{11}$, $R_{12}$, $R_{13}$, and $R_{14}$ are the same as those of $R_1$ in the general formula (VIII).

$V_1$, $V_2$, $V_3$, and $V_4$ each independently represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group.

The preferable examples of $V_1$, $V_2$, $V_3$, and $V_4$ are the same as those of $R_2$ in the general formula (VIII).

$Y_{31}$ to $Y_{38}$ each independently is the same as $Y_{11}$, $Y_{12}$, $Y_{13}$, $Y_{14}$, $Y_{15}$, $Y_{16}$, $Y_{17}$ and $Y_{18}$ respectively in the general formula (VIII), and the preferable examples are also the same.

M is the same as M in the general formula (VIII), and the preferable examples are also the same.

However, at least one of $R_{11}$, $R_{12}$, $R_{13}$, $R_{14}$, $V_1$, $V_2$, $V_3$, $V_4$, $Y_{31}$, $Y_{32}$, $Y_{33}$, $Y_{34}$, $Y_{35}$, $Y_{36}$, $Y_{37}$, and $Y_{38}$ is an ionic hydrophilic group or a group having an ionic hydrophilic group as a substituent.

The examples of ionic hydrophilic groups are the same as those of $X_{11}$, $X_{12}$, $X_{13}$, and $X_{14}$ in the general formula (VIII), and the preferable examples are also the same.

In the phthalocyanine compound represented in the general formula (IX), at least one ionic hydrophilic group or group having an ionic hydrophilic group as a substituent is present in one molecule, and therefore, the solubility or dispersion characteristics in an aqueous medium are satisfactory. From this standpoint, having at least 2 ionic hydrophilic groups in one molecule is preferable as a phthalocyanine compound represented by the general formula (IX); having at least one of several ionic hydrophilic groups be a sulfone group is more preferable; and among these, having at least 2 sulfone groups in one molecule is most preferable.

In the general formula (IX), the molecular weight of the phthalocyanine compound is preferably in the range of 750 to 3000, and more preferably a molecular weight in the range of 995 to 2500; and in that range, a molecular weight in the range of 995 to 2000 is more preferable, most preferably in the range of 995 to 1800.

However, if in the phthalocyanine compound represented by the general formula (IX) Pc (phthalocyan ring) forms a dimer (for example, Pc-M-L-M-Pc) or trimer via L (divalent connecting group), the preferred molecular weight, for example, the most preferable molecular weight would be two times (if a dimer) or 3 times (if a trimer) the most preferable molecular weight (in the range of 995-1800) described above. Here, the preferred molecular weight of the aforementioned dimer or trimer is the value comprising the connecting group L.

The more preferable compounds as the phthalocyanine compound represented by the general formula (IX) are compounds having a combination of (a) to (e) below.

(a) $R_{11}$, $R_{12}$, $R_{13}$, and $R_{14}$ are preferably a hydrogen atom, substituted or unsubstituted alkyl group, substituted or unsubstituted aryl group, or substituted or unsubstituted heterocyclic group; among these, preferably a hydrogen atom, substituted alkyl group, substituted aryl group, or substituted heterocyclic group; and most preferably a hydrogen atom.

(b) $V_1$, $V_2$, $V_3$, and $V_4$ are preferably a substituted or unsubstituted alkyl group, substituted or unsubstituted aryl group, or substituted or unsubstituted heterocyclic group; among these, preferably a substituted alkyl group, substituted aryl group, or substituted heterocyclic group; and most preferably a substituted alkyl group. Further, it is more preferable that at least one of $R_{11}$, $R_{12}$, $R_{13}$, $R_{14}$, $V_1$, $V_2$, $V_3$ and $V_4$ be an ionic hydrophilic group or group having an ionic hydrophilic group as a substituent.

(c) $Y_{31}$ to $Y_{38}$ each independently is preferably a hydrogen atom, halogen atom, alkyl group, aryl group, cyano group, alkoxy group, amide group, ureide group, sulfonamide group, carbamoyl group, sulfamoyl group, alkoxycarbonyl group, carboxyl group, or suifone group; more preferably a hydrogen atom, halogen atom, cyano group, carboxyl group or sulfone group; and most preferably a hydrogen atom.

(d) M is preferably Cu, Ni, Zn, or Al, and among these, Cu is most preferable.

(e) The molecular weight of the phthalocyanine compound is preferably in the range of 750 to 2500, and more preferably a molecular weight in the range of 995 to 2500; and in that range, a molecular weight in the range of 995 to 2000 is more preferable, most preferably in the range of 995 to 1800.

When combining the preferable substituents of the compound represented in the aforementioned general formula (IX), a compound in which at least one of the various substituents is a previously described preferred group is preferable; a compound in which more of the various substituents are previously described preferred groups is more preferable; a compound in which all of the substituents are previously described preferred groups is most preferable.

Of the phthalocyanine compounds represented by the general formula (IX), the phthalocyanine compounds with the structure represented by the following general formula (X) is more preferable. The phthalocyanine compound represented by the general formula (X) used in the present invention will be described in detail below.

Of the phthalocyanine compounds represented by the general formula (IX), the phthalocyanine compounds with the structure represented by the following general formula (X) is more preferable. The phthalocyanine compound represented by the general formula (X) that is suitably used in the present invention will be described in detail below.

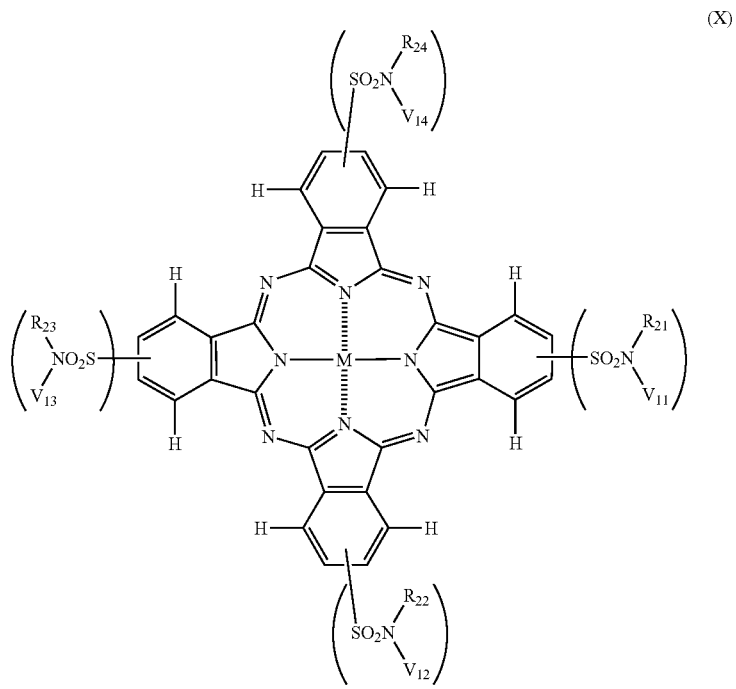

(X)

In the aforementioned general formula. (X), $R_{21}$, $R_{22}$, $R_{23}$, and $R_{24}$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group; a hydrogen atom, substituted alkyl group, substituted aryl group, or substituted heterocyclic group is more preferred; and among these, a hydrogen atom, or substituted alkyl group is preferable, with a hydrogen atom most preferable.

$V_{11}$, $V_{12}$, $V_{13}$, and $V_{14}$ each independently represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group; a substituted alkyl group, substituted aryl group, or substituted heterocyclic group is more preferable; and among these, most preferable is a substituted alkyl group.

The alkyl groups that $R_{21}$, $R_{22}$, $R_{23}$, $R_{24}$, $V_{11}$, $V_{12}$, $V_{13}$, and $V_{14}$ represent comprise alkyl groups having a substituent and unsubstituted alkyl groups. Alkyl groups having 1 to 12 carbon atoms when excluding the substituents are preferable as the alkyl groups. Examples of substituents include hydroxy groups, alkoxy groups, cyano groups, and halogen atoms and ionic hydrophilic groups. Examples of alkyl groups include: methyl, ethyl, isopropyl, t-butyl, hydroxyethyl, methoxyethyl, cyanoethyl, trifluoroethyl 3-sulfopropyl, and 4-sulfobutyl.

The cycloalkyl groups that $R_{21}$, $R_{22}$, $R_{23}$, $R_{24}$, $V_{11}$, $V_{12}$, $V_{13}$, and $V_{14}$ represent comprise cycloalkyl groups having a substituent and unsubstituted cycloalkyl groups. Cycloalkyl groups having 5 to 12 carbon atoms when excluding the substituents are preferable as the cycloalkyl groups. Examples of substituents include ionic hydrophilic groups. Examples of cycloalkyl groups include cyclohexyl groups.

The alkenyl groups that $R_{21}$, $R_{22}$, $R_{23}$, $R_{24}$, $V_{11}$, $V_{12}$, $V_{13}$, and $V_{14}$ represent comprise alkenyl groups having a substituent and unsubstituted alkenyl groups. Alkenyl groups having 2 to 12 carbon atoms when excluding the substituents are preferable as the alkenyl groups. Examples of substituents include ionic hydrophilic groups. Examples of alkenyl groups include vinyl groups, and aryl groups, etc.

The aralkyl groups that $R_{21}$, $R_{22}$, $R_{23}$, $R_{24}$, $V_{11}$, $V_{12}$, $V_{13}$, and $V_{14}$ represent comprise aralkyl groups having a substituent and unsubstituted aralkyl groups. Aralkyl groups having 7 to 12 carbon atoms when excluding the substituents are preferable as the aralkyl groups. Examples of substituents include ionic hydrophilic groups. Examples of aralkyl groups include benzyl groups, and 2-phenethyl groups.

The aryl groups that $R_{21}$, $R_{22}$, $R_{23}$, $R_{24}$, $V_{11}$, $V_{12}$, $V_{13}$, and $V_{14}$ represent comprise aryl groups having a substituent and unsubstituted aryl groups. Aryl groups having 6 to 12 carbon atoms when excluding the substituents are preferable as the aryl groups. Examples of substituents include alkyl groups, alkoxy groups, halogen atoms, alkylamino groups, and ionic hydrophilic groups. Examples of aryl groups include phenyl, p-tryl, p-methoxyphenyl, o-chlorophenyl, and m-(3-sulphopropylamino)phenyl.

The heterocyclic groups that $R_{21}$, $R_{22}$, $R_{23}$, $R_{24}$, $V_{11}$, $V_{12}$, $V_{13}$, and $V_{14}$ represent comprise heterocyclic groups having a substituent and unsubstituted heterocyclic groups.

The heterocyclic groups that $R_{21}$, $R_{22}$, $R_{23}$, $R_{24}$, $V_{11}$, $V_{12}$, $V_{13}$, and $V_{14}$ represent each independently may be a saturated heterocycle or an unsaturated heterocycle.

The heterocyclic groups that $R_{21}$, $R_{22}$, $R_{23}$, $R_{24}$, $V_{11}$, $V_{12}$, $V_{13}$, and $V_{14}$ represent each independently may form condensed rings with other rings.

The heterocyclic groups that $R_{21}$, $R_{22}$, $R_{23}$, $R_{24}$, $V_{11}$, $V_{12}$, $V_{13}$, and $V_{14}$ represent are preferably heterocyclic groups of 5 or 6 member rings.

The preferable heterocyclic groups and condensed rings thereof that $R_{21}$, $R_{22}$, $R_{23}$, $R_{24}$, $V_{11}$, $V_{12}$, $V_{13}$, and $V_{14}$ represent are nitrogen heterocycles comprising 5 to 6 members (and may further form condensed rings with other rings).

Examples of the heterocyclic groups and condensed rings thereof that $R_{21}$, $R_{22}$, $R_{23}$, $R_{24}$, $V_{11}$, $V_{12}$, $V_{13}$, and $V_{14}$ represent are given below in the form of a heterocycle with the substitution position omitted, but the substitution position is not limited, and if pyridine, for example, may be substituted at positions 2, 3, 4.

Specifically, examples include: pyridine, pyrazine, pyrimidine, pyridazine, quinoline, isoquinoline, quinazoline, cinnoline, phthalazine, quinoxaline, pyrrole, benzopyrrole, indole, furan, benzofuran, thiophene, benzothiophene, pyrazole, benzopyrazole, imidazole, benzimidazole, triazole, oxazole, benzoxazole, thiazole, benzothiazole, isothiazole, benzisothiazole, thiadiazole, isooxazole, benzisooxazole, pyrrolidine, piperidine, piperazine, imidizolidine, and thiazoline. Among them, aromatic heterocyclic groups are preferable, and preferable examples thereof include, as described above, pyridine, pyrazine, pyrimidine, pyridazine, pyrazole, imidazole, benzimidazole, triazole, thiazole, benzothiazole, isothiazole, benzisothiazole, and thiadiazole.

Further examples of substituents when the heterocyclic groups that $R_{21}$, $R_{22}$, $R_{23}$, $R_{24}$, $V_{11}$, $V_{12}$, $V_{13}$, and $V_{14}$ represent have substituents include: alkyl groups (R—), alkoxy groups (RO—), alkylamino groups (RNH—, RR'N—), carbamoyl groups (—CONHR), sulfamoyl groups (—SO$_2$NHR), sufonylamino groups (—NHSO$_2$R), halogen atoms, and ionic hydrophilic groups (the aforementioned R and R' represent alkyl groups and phenyl groups, and these may have further ionic hydrophilic groups).

M is the same as M in the general formula (VIII), and the preferable examples are also the same.

However, at least one of $R_{21}$, $R_{22}$, $R_{23}$, $R_{24}$, $V_{11}$, $V_{12}$, $V_{13}$, and $V_{14}$ has an ionic hydrophilic group as a substituent.

The examples of ionic hydrophilic groups are the same as those of $X_{11}$, $X_{12}$, $X_{13}$, and $X_{14}$ in the general formula (VIII), and the preferable examples are also the same.

The molecular weight of the phthalocyanine compound is preferably in the range of 750 to 2500, and more preferably a molecular weight in the range of 995 to 2500; and within that, a molecular weight in the range of 995 to 2000 is more preferable, most preferably a molecular weight in the range of 995 to 1800.

In the phthalocyanine compound represented in the general formula (X), at least one ionic hydrophilic group or group having an ionic hydrophilic group as a substituent is present in one molecule, and therefore, the solubility or dispersion characteristics in an aqueous medium are satisfactory. From this standpoint, having at least 2 ionic hydrophilic groups in one molecule is preferable as a phthalocyanine compound represented by the aforementioned general formula (X); having at least one of several ionic hydrophilic groups be a sulfone group is more preferable; and among these, having at least 2 sulfone groups in one molecule in the phthalocyanine compound is most preferable.

The more preferable compounds as the phthalocyanine compound represented by the aforementioned general formula (X) are compounds having a combination of (a) to (e) below.

(a) $R_{21}$, $R_{22}$, $R_{23}$, and $R_{24}$ each independently represents a hydrogen atom, substituted or unsubstituted alkyl group, substituted or unsubstituted cycloakyl group, substituted or unsubstituted alkenyl group, substituted or unsubstituted aralkyl group, substituted or unsubstituted aryl group, or substituted or unsubstituted heterocyclic group; and a hydrogen atom, substituted alkyl group, substituted aryl group, or substituted heterocyclic group is more preferable; and among these, most preferable is a hydrogen atom.

(b) $V_{11}$, $V_{12}$, $V_{13}$, and $V_{14}$ each independently represents a substituted or unsubstituted alkyl group, substituted or unsubstituted aryl group, or substituted or unsubstituted heterocyclic group; and more preferable is a substituted alkyl group, substituted aryl group, or substituted heterocyclic group; and among these, most preferable is a substituted alkyl group having a ionic hydrophilic substituent.

(c) M is preferably Cu, Ni, Zn, or Al, and among these, Cu is most preferable.

(d) The molecular weight of the phthalocyanine compound is preferably in the range of 750 to 2500, and more preferably a molecular weight in the range of 995 to 2500; and in that range, a molecular weight in the range of 995 to 2000 is more preferable, most preferably in the range of 995 to 1800.

(e) Since the phthalocyanine compound represented in the general formula (X) has at least one ionic hydrophilic group in one molecule, the solubility or dispersion characteristics in an aqueous medium are satisfactory. From this standpoint, having at least 2 ionic hydrophilic groups in one molecule is preferable as a phthalocyanine compound represented by the aforementioned general formula (X); having at least one of several ionic hydrophilic groups be a sulfone group is more preferable; and among these, having at least 2 sulfone groups in one molecule is most preferable.

When combining the preferable substituents of the compound represented in the aforementioned general formula (X), a compound in which at least one of the various substituents is a previously described preferred group is preferable; a compound in which more of the various substituents are previously described preferred groups is more preferable; a compound in which all of the substituents are previously described preferred groups is most preferable.

Using various kinds of phthalocyanine derivatives in ink compositions for inkjet recording is a common practice. The phthalocyanine derivatives represented in general formula (XI) below may at the time of synthesis unavoidably comprise substituents $R_n$ (n=1 to 16), which are substitution position isomers (defined here by $R_1$: position 1 to $R_{16}$: position 16), but these substitution position isomers may often be regarded as the same derivative without mutually distinguishing them. In addition, even if substituents of R comprise isomers, the isomers may often be regarded as the same phthalocyanine derivatives without distinction.

General Formula (XI)

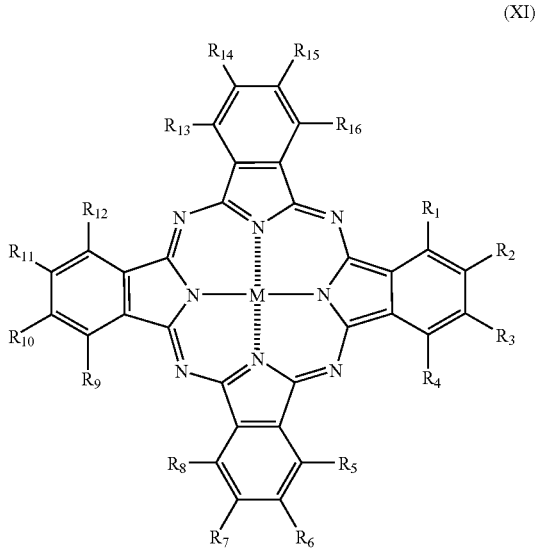

General formula (XI) will be used to explain cases when the structure of the phthalocyanine-based colors defined in the present Description differs, which may be when the types of structural elements of the substituents ($R_n$ (n=1 to 16)) differ, when the number of substituents $R_n$ differ, or when the positions of the substituent $R_n$ differ.

In the present invention, derivatives of the phthalocyanine-based colors represented by. the aforementioned general formula (XI) having differing structures (substitution positions in particular) are defined by classifying into the following three categories.

β-position substitution type: (phthalocyanine compounds having a specific substituent at position 2 and/or 3, position 6 and/or 7, position 10 and/or 11, position 14 and/or 15).

α-position substitution type: (phthalocyanine compounds having a specific substituent at position 1 and/or 4, 5 and/or 8, position 9 and/or 12, position 13 and/or 16-position).

αβ-position mixed substitution type: (phthalocyanine compounds having a specific substituent at positions 1 to 16 without regularity).

In the present invention, the aforementioned β-position substitution type, α-position substitution type and αβ-position mixed substitution type are used to explain derivatives of phthalocyanine-based colors having differing structures (substitution positions in particular).

The phthalocyanine derivatives used in the present invention can be synthesized by a combination of methods described and quoted in, for example, "Phthalocyanine: Chemistry and Function", pp. 1 to 62, coauthored by Shirai and Kobayashi, published by IPC K.K., and "Phthalocyanines: Properties and Applications", pp. 1 to 54, coauthored by C. C. Leznoff and A. B. P. Lever, published by VCH, etc. and by analogous methods.

The phthalocyanine compound represented by the general formula (VIII) used in the present invention can be synthesized, for example, via sulfonation, sulfonylchlorination and amidation of an unsubstituted phthalocyanine compound as described in WO 00/17275, 00/08103, 00/08101, 98/41853, Japan Laid-Open Patent Application No. 10-36471.

In this case, while sulfonation can take place at any position on a phthalocyanine nucleus, the number of sulfonation positions is difficult to control.

Consequently, when a sulfone group is introduced under such reaction conditions, the positions and numbers of sulfone groups introduced into the product cannot be specified, always resulting in formation of mixtures having differing numbers of substituents and substitution positions.

Consequently, when a compound of the invention is synthesized using this as a raw material, the number and substitution position of heterocyclic ring substituted sulfamoyl groups cannot be specified, and therefore, the compound is obtained as a mix comprising several kinds of compounds having differing numbers of substituents and substitution positions.

Among the phthalocyanine compounds represented by the aforementioned general formulae (VIII) to (X), for example, the phthalocyanine compounds represented by the following general formula (XII) is synthesized, for example, by allowing the phthalonitrile derivative represented by the following general formula (XIII) and/or the diiminoisoindoline derivative represented by the following general formula (XIV) with the metal derivative represented by the general formula (XV).

Meanwhile, the phthalocyanine compound represented by the general formula (XII) can be synthesized by: synthesizing phthalocyanine copper (II)-sodium tetrasulfonate-4 by allowing the metal derivative represented by general formula (XV) to react with 4-sulfophthalate-sodium salt represented by general formula (XVI); then, the corresponding sulfonyl chloride is derived, and allowed to react with the target amine and/or aniline derivative (For example, when $G_1$, $G_2$, $G_3$, and $G_4$ are $G_1$: {—$SO_2N$ ($R_{21}$) ($V_{11}$)}, $G_2$: {—$SO_2N$ ($R_{22}$) ($V_{12}$)}, $G_3$: {—$SO_2N$ ($R_{23}$) ($V_{13}$)}, and $G_4$: {—$SO_2N$ ($R_{24}$) ($V_{14}$)}).

Further, I, m, n, p in the general formula (XII) have the same meaning as t in the general formula (XIII) and/or the general formula (XIV), and t is an integer of 1 to 2. Moreover, $G_1$, $G_2$, $G_3$, and $G_4$ in the general formula (XII) each independently represents $G_1$: {—$SO_2N$ ($R_{21}$) ($V_{11}$)}, $G_2$: {—$SO_2N$ ($R_{22}$) ($V_{12}$)}, $G_3$: {—$SO_2N$ ($R_{23}$) ($V_{13}$)}, and $G_4$: {—$SO_2N$ ($R_{24}$) ($V_{14}$)} in the general formula (X).

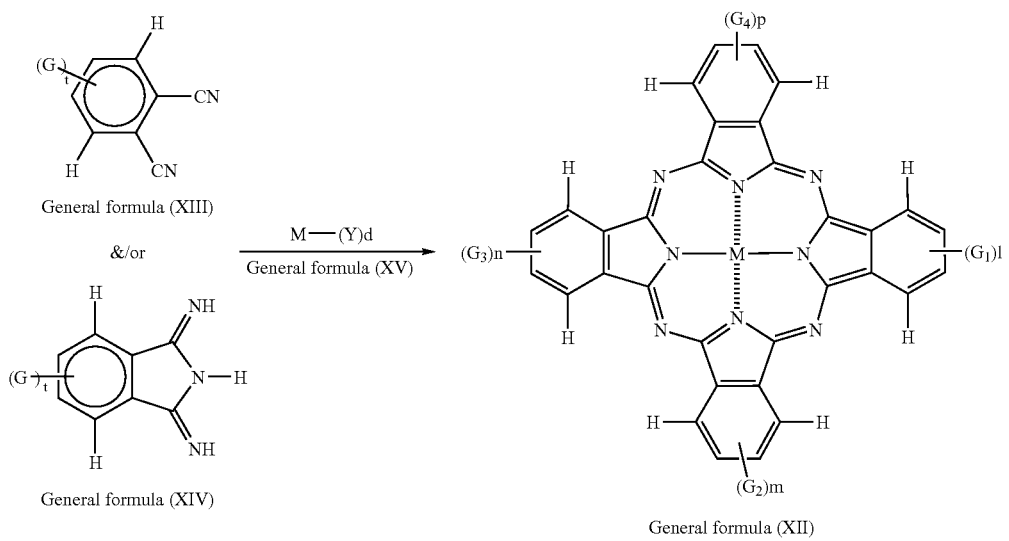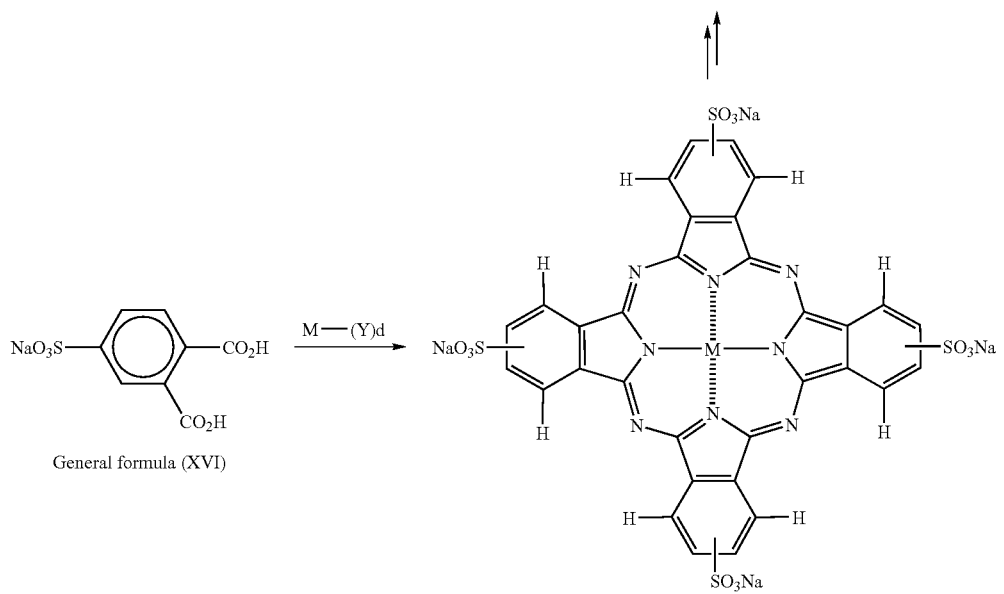

The compounds represented by the aforementioned general formula (XII) obtained in this way are normally mixtures of compounds represented by the following general formulae (a)-1 to (a)-4, which are isomers at the substitution positions of $R_1$ ($SO_2$-$Z_1$), $R_2$ ($SO_2$-$Z_2$), $R_3$ ($SO_2$-$Z_3$), and $R_4$ ($SO_2$-$Z_4$).

Further, if using the general formula (XIII) and/or the general formnula (XIV) having 2 or more different substituents to adjust the dye, the compound represented by the general formula (XII) will be a dye mixture with substituents of differing kinds and positions.

General formula (a)-1

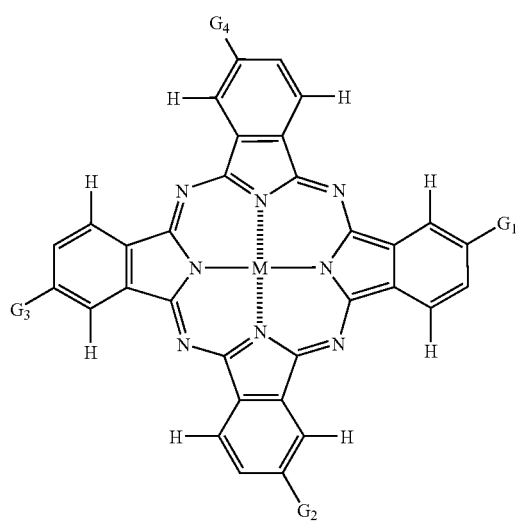

General formula (a)-2

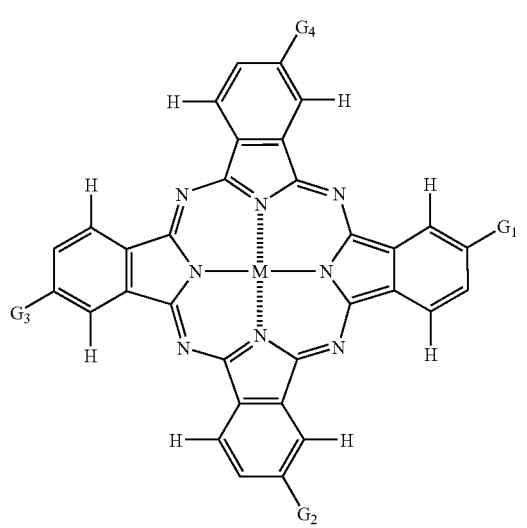

General formula (a)-3

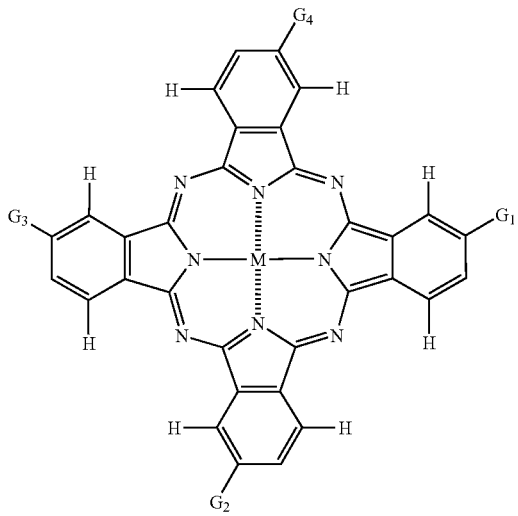

General formula (a)-4

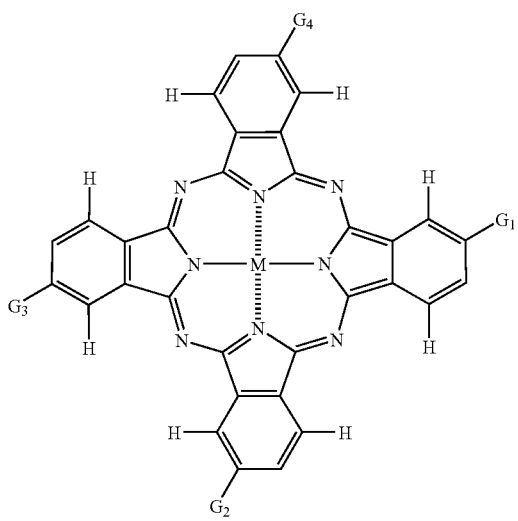

The compounds with related structures described in Japanese Laid-Open Patent Application No. 2002-256167, 2002-275386, 2002-285050, 2002-294097, 2002-302623, 2002-309118, 2003-213167, and 2003-213168 may be cited as examples of cyan dyes used in the present invention, but those listed in the following table are more preferable. The compounds listed in Table 3 may be synthesized by the methods described in the patents above. Naturally, [the present invention] is not limited to these departure compounds, dye intermediates, and synthesis methods.

TABLE 3

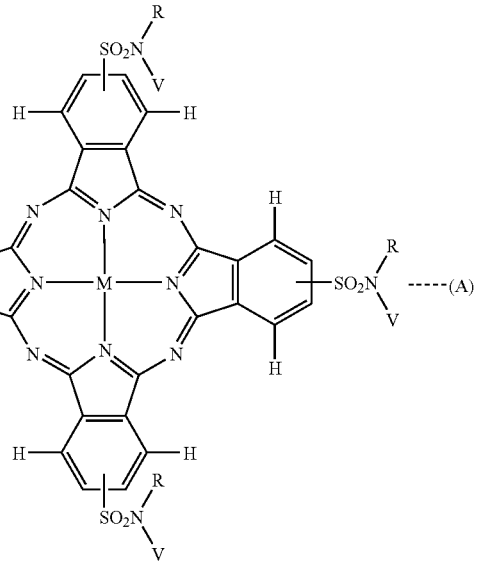

| | M | R | V |
|---|---|---|---|
| Compound A | Cu | H | —CH$_2$CH$_2$CH$_2$N[—CH$_2$CH$_2$OCO—C$_6$H$_4$—SO$_3$Li]$_2$ |
| Compound B | Cu | H | —CH$_2$CH$_2$CH$_2$N[—CH$_2$CH$_2$OCO—C$_6$H$_4$—SO$_3$K]$_2$ |
| Compound C | Cu | H | (3-methylphenyl)-NH-SO$_2$-(3-SO$_3$Li-phenyl) |
| Compound D | Cu | H | (3-methylphenyl)-NH-SO$_2$-(3-SO$_3$Na-phenyl) |
| Compound E | Cu | H | —(CH$_2$)$_3$N(CH$_2$CH$_2$OH)$_2$·HCl |
| Compound F | Cu | H | —(CH$_2$)$_3$—N$^+$(CH$_2$CH$_2$OH)$_2$(CH$_3$) · C$_6$H$_5$SO$_3^-$ |

The dye content is better determined by the type of compound represented the general formula (VIII) and type of solvent component, but a range of 0.1 to 10 weight % in relation to the total weight of ink composition is preferable, and a range of 0.5 to 5 weight % is more preferable. By making the weight % 0.1 or more, the image concentration or color characteristics in the recording medium can be guaranteed; and by making the weight % 10 or less, the viscosity of the ink composition is easy to adjust, and such characteristics as the discharge reliability and clogging characteristics can be easily guaranteed.

The ink composition of the present invention contains one or more kinds of aromatic compounds and/or the salts thereof having a specified sulfone group in order to control discoloration (phenomena caused by the phthalocyanine group cyan dye having inferior gas fastness, ozone fastness in particular) observed when solid printing using the ink composition containing the aforementioned phthalocyanine group cyan dye.

By using a combination of the aromatic compounds and/or the salts thereof having the related specified sulfone group with the phthalocyanine group cyan dye indicated in the aforementioned general formula (VIII), the present invention prevents discoloration of images deriving from ozone gas, and dramatically improves the anti-fading characteristics of the image.

In addition, in the present invention, if the ink composition contains water, the aforementioned phthalocyanine group cyan dye, and at least one or more kinds of aromatic compounds and/or the salts thereof having a specified sulfone group, naturally the ink composition, even if for example an ink composition of a color different than cyan such as a black ink composition, can effectively prevent the fading observed with solid printing. Joint use with other dyes well known in the past is possible in order to produce these kinds of ink compositions.

The aromatic compound or salt thereof having a sulfone group being used in the ink composition of the present invention is an aromatic compound or salt thereof having a sulfone group represented by the following general formula (a) and/or (b). By comprising the said aromatic compound or salt thereof having a sulfone group, the fading of images caused by ozone gas can be prevented and the anti-fading characteristics of the image can be improved without the phenomena of $NO_x$ gases causing the image to turn green or black.

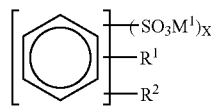
(a)

(In the formula, $M^1$ indicates an ion comprising a salt; X indicates an integer of 1 to 3; $R^1$ and $R^2$ indicate respectively a hydrogen atom, an alkyl group having 1 to 6 carbon atoms, or an alkoxy group having 1 to 6 carbon atoms; and $R^1$ and $R^2$ may be the same or different.)

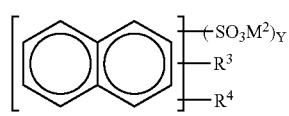
(b)

(In the formula, $M^2$ indicates an counter-ion comprising a salt; Y indicates an integer of 1 to 4; $R^3$ and $R^4$ indicate respectively a hydrogen atom, an alkyl group having 1 to 6 carbon atoms or an alkoxy group having 1 to 6 carbon atoms; and $R^3$ and $R^4$ may be the same or different.)

The aromatic compound or salt thereof having a sulfone group represented by the aforementioned general formulae (a) and/or (b) may be any aromatic compound or the salt thereof having at least one sulfone group in the molecular structure, but in terms of improving the ozone fastness characteristics of the image obtained, it is preferable to have at least one kind selected from the group comprising 1,3-benzene disulfonate, naphthalene-1,5-disulfonate, naphthalene-1,6-disulfonate, naphthalene-2,6-disulfonate, naphthalene-2,7-disulfonate, naphthalene-1,3,6-trisulfonate, and the salts of these.

The salt of the aromatic compound having a sulfone group may be contained in the ink composition by adding the compound in the form of a salt, or may be contained in the ink composition by separately adding a salt group and the said aromatic compound having a sulfone group. This kind of salt is not particularly limited to structural counter-ions, and include, for example, metal salts and ammonia salts, etc., but alkali metal salts are more preferable, specifically, sodium salt, lithium salt, and potassium salt, etc.

The content of the aromatic compound and/or salt thereof having a sulfone group is suitably determined by the related type of aromatic compound and/or salt thereof having a sulfone group, the type of dye, and the type of solvent component, etc., but a range of 0.1 to 10 weight % in relation to the total weight of ink composition is preferable, and a range of 0.5 to 10 weight % is more preferable.

In the ink composition of the present invention, from the perspective of effectively improving anti-gas characteristics and guaranteeing ink reliability, the content percentage of the aforementioned phthalocyanine group cyan dye and the aforementioned aromatic compound and/or salt thereof having a sulfone group is preferably in the range of 1:0.1 to 1:10, and more preferably in the range of 1:0.2 to 1:5.

In order to stabilize the amounts and dissolve the specified dye and the aromatic compound and/or salt thereof having a sulfone group, the pH of the ink composition (20° C.) is preferably 8.0 or more. In view of the anti-material characteristics and the various types of parts that the ink composition contacts, the pH of the ink composition is preferably 10.5 or less. In order to satisfy both of these conditions, it is preferable to adjust the pH of the ink composition to 8.0 to 10.5, and more preferably, 8.5 to 10.0.

The ink composition of the present invention can comprise humectant selected from sugars and/or aqueous organic solvents having a vapor pressure smaller than that of purified water.

By comprising humectant, the vaporization of water in the inkjet recording system can be controlled, and the moisture in the ink can be maintained. In addition, if an aqueous organic solvent is used, the discharge stability can be improved, and the viscosity can be easily modified without changing the characteristics of the ink.

An aqueous organic solvent indicates a medium having a capacity to dissolve soluble substance, and may be selected from organic aqueous solvents having a vapor pressure smaller than that of water. Specifically, preferable examples include: ethylene glycol, propylene glycol, butane diol, pentane diol, 2-butene-1,4-diol, 2-methyl-2,4-pentane diol, glycerin, 1,2,6-hexane triol, diethylene glycol, triethylene glycol, polyvalent alcohols such as dipropylene glycol, ketones such as acetonyl acetone, y-butyrolactone, esters such as triethyl phosphate, furfuryl alcohol, tetrahydrofurfuryl alcohol, and thiodiglycol.

In addition, maltitol, sorbitol, gluconolactone, and maltose, etc., are preferable as sugars.

Humectant are preferably added in a range of 5 to 50 weight % in relation to the total weight of the ink composition, more preferably 5 to 30 weight %, and even more preferably in a range of 5 to 20 weight %. If 5 weight % or more, moisturizing is obtained, and if 50 weight % or less, it is easy to adjust the viscosity used in inkjet recording.

In addition, the ink composition of the present invention preferably contains a nitrogenous group organic solvent as a solvent. 1,3-dimethyl-2-imidazolidinone, 2-pyrrolidone, N-methyl-2-pyrridone, ε-caprolactam, etc. may be cited as the nitrogenous group organic solvent, and among these, 2-pyrrolidone may be suitably used. These solvents may be used singly or in combinations of 2 or more.

The content is preferably 0.5 to 10 weight %, and 1 to 5 weight % is more preferable. With a content of 0.5% or more, it is possible to improve the solubility of added color material of the present invention, and a content of 10 weight % or less will not heighten deterioration of the material characteristics of the various parts that the ink composition contacts.

In addition, the ink composition of the present invention preferably contains a nonionic surfactant as an effective additive to maintain the roundness of 1 dot at the same time as obtaining rapid adhesion (permeability) of the ink.

Acetylene glycol group surfactants may be cited as examples of the nonionic surfactants that can be used in the present invention. Specifically, Surfynol 465, Surfynol 104 (manufactured by Air Products and Chemicals, Inc.), Olfin E1010, Olfin PD001, and Olfin STG (manufactured by Nisshin Chemical Industries (Co., Ltd.), product name), etc. may be cited as acetylene glycol group surfactants. Preferably, the amount added is 0.1 to 5 weight %, and more preferably, 0.5 to 2 weight %. Sufficient permeability can be obtained by adding 0.1 weight % or more, and the blurring the image can be easily prevented with 5 weight % or less.

In view of improving permeability, the ink composition of the present invention preferably comprises a permeation promoter. The addition of glycol ethers as the said permeability promoter further increases permeability, and decreases boundary bleeding with neighboring color inks when conducting color printing; thus extremely fresh images can be obtained.

Glycol ethers include: ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, triethylene glycol monobutyl ether, etc. The amount added is 3 to 30 weight %, preferably 5 to 15 weight %. If less than 3 weight % is added, the effect to prevent bleeding is not obtained. Moreover, if 30 weight % is exceeded, solubilizer of these glycol ethers will be necessary because only blurring will be produced on the image or oil-like separation will occur; and in conjunction with this, the ink viscosity will increase and discharge from the inkjet heads will become difficult.

Further, pH modifiers such as triethanolamine and hydroxides of alkali metals, hydrotropic agents such as urea and the derivatives thereof, water soluble polymers such as sodium alginate, water soluble resin, fluorine-based surfactants, antifungal agents, antirust agents, and preservatives, etc. may be added as necessary into the composition of the present invention.

Methods to adjust the ink composition of the present invention include, for example, thoroughly mixing and dissolving the various components, conducting pressurized filtration using a membrane filter with a pore size of 0.8 μm, and then adjusting by deaeration processing using a vacuum pump.

The present invention may also be provided in an ink cartridge comprising at least the previously described ink composition. The ink cartridge of the present invention can simplify the transportation and handling of an ink that can improve the preservation characteristics (gas fastness) of the formed image, and that can effectively prevent rapid fading of the image.

Next, the recording method of the present invention using the above described ink composition will be explained. Above all, the recording method of the present invention can be suitably used in the inkjet recording system in which the ink composition is discharged as ink droplets from micropores, and the said ink droplets adhere to a recording medium; but obviously, the ink composition of the present invention can be used in general transcribers, recorders, pen plotters, etc.

Any conventional, well-known system can be used as the inkjet recording system, and in particular, methods that discharge the ink droplets using the piezoelectric vibration (recording methods that use inkjet heads that form ink drops by mechanical deformation of electrostriction elements), and methods using thermal energy can conduct superior image recording.

In addition, the record of the present invention is recorded using the ink composition described above, is superior in preservation characteristics (gas fastness), and does not fade rapidly.

The present invention will be concretely explained below by citing examples of the present invention and comparative examples, but the present invention is in no way limited to the related examples.

EXAMPLES 1 to 13, AND COMPARATIVE EXAMPLES 1 to 9

The ink compositions of Examples 1 to 13 and Comparative Examples 1 to 9 were prepared by mixing and dissolving the components in the configurations and percentages indicated in Table 4, and were pressured filed using a membrane filter with a pore size of 1 μm.

TABLE 4

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Color material | Compound A cited in Table 1 | 1 | | | | | | | | | | | | |
| | Compound B cited in Table 1 | | 1.5 | | | | | | | | | | | |
| | Compound C cited in Table 1 | | | 1 | 1 | | | | | | | | | |
| | Compound D cited in Table 1 | | | | | 0.5 | 0.5 | | | | | | | |
| | Compound E cited in Table 1 | | | | | | | | 1 | | | | | |
| | Compound F | | | | | | | | | 0.5 | | | | |

TABLE 4-continued

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| | Compound G cited in Table 2 | | | | | | | | | 1 | | | | |
| | Compound H cited in Table 2 | | | | | | | | | | 1 | | | |
| | Compound I cited in Table 2 | | | | | | | | | | | 1.5 | | |
| | Compound J cited in Table 2 | | | | | | | | | | | | 1.5 | |
| | Compound K cited in Table 2 | | | | | | | | | | | | | 0.5 |
| | CI direct blue 199 (*1) | | | | | | | | | | | | | |
| Solvents, etc. | Glycerin | 10 | 5 | 10 | 10 | 3 | 3 | | | 5 | 5 | 5 | 10 | 10 |
| | Triethylene glycol | 10 | 10 | 10 | 10 | 15 | 15 | 20 | 20 | 5 | 10 | 10 | 3 | 3 |
| | 2-pyrrolidone | | 1 | 1 | 1 | 0.5 | 0.5 | 1 | 1 | | 1 | 1 | 2 | 2 |
| | Triethanolamine | 1 | | | | 0.5 | 0.5 | | | 1 | | | 0.5 | 0.5 |
| | Diethylene glycol monobutyl ether | | | 10 | 10 | | | | | | | | 8 | 8 |
| | Triethylene glycol monobutyl ether | 10 | 10 | | | 12 | 12 | 10 | 10 | 10 | 10 | 10 | | |
| | Olfin E1010 (*2) | 1 | 1 | | | 0.5 | 0.5 | | | | 1 | 1 | | |
| | Olfin PD001 (*2) | | | 1 | 1 | | | 1 | 1 | 1 | | | 1 | 1 |
| | Lithium hydride 1 hydrate | | | | 0.4 | | | | | | | | | |
| | Potassium hydride | | | | | | | | | | | 1 | | |
| | Ammonia water (25% aq.) | | | | 2.7 | | | | | | | | | |
| Additives | Benzene sulfonate | | | | | | | | | | | 3 | | |
| | Sodium benzene sulfonate | | 3 | | | | | | | | | | | |
| | Sodium benzene-1,3-disulfonate 2 | | | | | 0.1 | | | | | | | | |
| | Potassium benzene-1,3-disulfonate 2 | | | | | | 0.5 | | | | | | | |
| | Naphthalene-1-sulfonate | | | 2 | 2 | | | | | | | | | |
| | Sodium naphthalene-1-sulfonate | | | | | | | 0.1 | | | | | | |
| | Sodium naphthalene-2-sulfonate | | | | | | | | | | 3 | | | |
| | Sodium naphthalene-1,5-disulfonate 2 | | 3 | | | | | | | | | | | |
| | Sodium naphthalene-1,6-disulfonate 2 | | | | | | | | 5 | | | | | |
| | Sodium naphthalene-2,6-disulfonate 2 | | | | | | | | | 4 | | | | |
| | Sodium naphthalene-2,7-disulfonate 2 | | | | | | | | | | | 5 | | |
| | Sodium naphthalene 1,3,6-trisulfonate 3 | | | | | | | | | | | | | 10 |
| | 6-amino naphthalene-1-sulfonate | | | | | | | | | | | | | |
| | Sodium p-hydroxy benzene sulfonate | | | | | | | | | | | | | |
| | Sodium 4,5-dihydroxynaphthalene-2,6-disulfonate 2 | | | | | | | | | | | | | |
| | Sodium 3- | | | | | | | | | | | | | |

TABLE 4-continued

|  |  |  |  |  |  |  |  |  |  |  |  |  |  |
|---|---|---|---|---|---|---|---|---|---|---|---|---|---|
| | aminonaphthalene-1,5-disulfonate 2 | | | | | | | | | | | | | |
| | Sodium 7-amino-4-hydroxynaphthalene-2-sulfonate | | | | | | | | | | | | | |
| | Naphthalene-1-carbonate | | | | | | | | | | | | | |
| | Ethane-1-sulfonate | | | | | | | | | | | | | |
| Other | Proxel XL-2 (*3) | 0.3 | 0.3 | 0.3 | 0.3 | 0.3 | 0.3 | 0.3 | 0.3 | 0.3 | 0.3 | 0.3 | 0.3 | 0.3 |
| | Water | Remainder | | | | | | | | | | | | |
| Percentage of color material and aromatic sulfonate | | 1:3 | 1:2 | 1:2 | 1:2 | 1:0.2 | 1:1 | 1:0.1 | 1:10 | 1:4 | 1:3 | 1:2 | 1:3.3 | 1:10 |

| | | | Comparative example | | | | | | | | |
|---|---|---|---|---|---|---|---|---|---|---|---|
| | | | 1 | 2 | 3 | 4 | 5 | 6 | 7 | 8 | 9 |
| Color material | Compound A cited in Table 1 | | 1 | | 1 | | | | | | |
| | Compound B cited in Table 1 | | | | | 1.5 | | | | | |
| | Compound C cited in Table 1 | | | | | | 1 | 1 | 1 | | |
| | Compound D cited in Table 1 | | | | | | | | | | |
| | Compound E cited in Table 1 | | | | | | | | | | |
| | Compound F cited in Table 2 | | | | | | | | | | |
| | Compound G cited in Table 2 | | | | | | | | | 1 | |
| | Compound H cited in Table 2 | | | | | | | | | | 1 |
| | Compound I cited in Table 2 | | | | | | | | | | |
| | Compound J cited in Table 2 | | | | | | | | | | |
| | Compound K cited in Table 2 | | | | | | | | | | |
| | CI direct blue 199 (*1) | | | 1 | | | | | | | |
| Solvents, etc. | Glycerin | | 10 | 10 | 10 | 5 | 10 | 10 | 10 | 5 | 5 |
| | Triethylene glycol | | 10 | 10 | 10 | 10 | 10 | 10 | 10 | 5 | 10 |
| | 2-pyrrolidone | | | | | 1 | 1 | 1 | 1 | | 1 |
| | Triethanolamine | | 1 | 1 | 1 | | | | | 1 | |
| | Diethylene glycol monobutyl ether | | | | | | 10 | 10 | 10 | | |
| | Triethylene glycol monobutyl ether | | 10 | 10 | 10 | 10 | | | | 10 | 10 |
| | Olfin E1010 (*2) | | 1 | 1 | 1 | 1 | | | | | 1 |
| | Olfin PD001 (*2) | | | | | | 1 | 1 | 1 | 1 | |
| | Lithium hydride 1 hydrate | | | | | | 0.4 | 0.4 | | | |
| | Potassium hydride | | | | | | | | | | |
| | Ammonia water (25% aq.) | | | | | | | | 2.6 | | |
| Additives | Benzene sulfonate | | | | | | | | | | |
| | Sodium benzene sulfonate | | | | | | | | | | |
| | Sodium benzene-1,3-disulfonate 2 | | | | | | | | | | |
| | Potassium benzene-1,3-disulfonate 2 | | | | | | | | | | |
| | Naphthalene-1-sulfonate | | | | | | | | | | |
| | Sodium naphthalene-1- | | | | | | | | | | |

TABLE 4-continued

| | | 1 | 2 | 3 | 4 | 5 | 6 | 7 | 8 | 9 |
|---|---|---|---|---|---|---|---|---|---|---|
| | Sodium naphthalene-1-sulfonate | | | | | | | | | |
| | Sodium naphthalene-2-sulfonate | | | 3 | | | | | | |
| | Sodium naphthalene-1,5-disulfonate | | 2 | | | | | | | |
| | Sodium naphthalene-1,6-disulfonate | | 2 | | | | | | | |
| | Sodium naphthalene-2,6-disulfonate | | 2 | | | | | | | |
| | Sodium naphthalene-2,7-disulfonate | | 2 | | | | | | | |
| | Sodium naphthalene 1,3,6-trisulfonate | | | 3 | | | | | | |
| | 6-aminonaphthalene-1-sulfonate | | | | | 2 | | | | |
| | Sodium p-hydroxy benzene sulfonate | | | | | | 3 | | | |
| | Sodium 4,5-dihydroxynaphthalene-2,6-disulfonate | | | | | | | | 4 | |
| | Sodium 3-aminonaphthalene-1,5-disulfonate | | | | 3 | | | | | |
| | Sodium 7-amino-4-hydroxynaphthalene-2-sulfonate | | | | | | | | | 3 |
| | Naphthalene-1-carbonate | | | | | | | 2 | | |
| | Ethane-1-sulfonate | | | | | | | | | 2 |
| Other | Proxel XL-2 (*3) | 0.3 | 0.3 | 0.3 | 0.3 | 0.3 | 0.3 | 0.3 | 0.3 | 0.3 |
| | Water | Remainder | | | | | | | | |
| | Percentage of color material and aromatic sulfonate | — | 1:3 | 1:3 | 1:2 | 1:2 | — | — | 1:4 | 1:3 |

(*1) A substance having the absorption wavelength cited in FIG. 1 is used.
(*2) Manufactured by Nisshin Chemical Co., Ltd.
(*3) Manufactured by Avecia Ltd.

Further, the components of the ink compositions indicated in Table 4 and the weight % of the components in relation to the total weight of the ink composition is indicated, and the remainder is water. In addition, the compounds (compounds A to F) indicated in the aforementioned Table 1 were used for the color materials in the examples and comparative examples. However, C.I. direct blue 199 was used in Comparative Example 2.

An inkjet printer PM 970C (manufactured by Seiko Epson Co., Ltd.) was used to print the aforementioned ink compositions of Examples 1 to 13 and Comparative Examples 1 to 9 onto an inkjet custom recording material (Premium Glossy Photo Paper. manufactured by Seiko Epson Co., Ltd.), and the following assessments were conducted.

<Ozone Fastness Test>

Prints were obtained by using the aforementioned cartridge to conduct the printing and by adjusting the print duty so that the OD (optical density) was in the range of 0.9 to 1.1, and the prints obtained were exposed for a specified time (12 and 24 hours) under the conditions of 24° C., relative humidity 60% RH, and ozone concentration 20 ppm using an ozone weather meter Model OMS-H (product name, manufactured by Suga Test equipment (Co., Ltd.)).

After exposure, the OD of the various prints was measured using a concentration meter (Spectrolino: manufactured by Gretag Co.), and the residual optical density percentage (ROD) was derived by the following formula, and assessments were made using the judgment criteria below.

ROD (%) = $(D/D_0) \times 100$

D: OD after exposure test $D_0$: OD prior to exposure test (Here, the measurement conditions were: Filter: Red; light source: D50; angle of visual field: 2 degrees)

[Judgment criteria]

Assessment A: ROD of 90% or more

Assessment B: ROD of 80% or more and less than 90%

Assessment C: ROD of 70% or more and less than 80%

Assessment D: ROD of 70% or less

<Nitrous Oxide Test>

Prints were obtained by using the aforementioned cartridge filled with the ink compositions of Examples 1 to 13 and Comparative Examples 1 to 9 to conduct the printing and by adjusting the print duty so that the OD (optical density) was in the range of 0.9 to 1.1, and the prints were exposed for a specified time (12 and 24 hours) under the conditions of 24° C., relative humidity 60% RH, and nitrogen dioxide concentration 10 ppm using an gas corrosion test meter Model GS-UV (product name, manufactured by Suga Test equipment (Co., Ltd.)).

After exposure, the CIE-L*a*b* coordinates of the various prints were measured using a concentration meter (Spectrolino: manufactured by Gretag Co.), and the color difference (ΔE) was derived by the following formula, and assessments were made using the judgment criteria below.

$$\Delta E = \{(L^* - L_0^*)^2 + (a^* - a_0^*)^2 + (b^* - b_0^*)^2\}^{1/2}$$

L*, a*, b*: Coordinate values after exposure test
$L_0^*$, $a_0^*$, $b_0^*$: Coordinate values before exposure test
[Judgment Criteria]
Assessment A: ΔE is less than 3
Assessment B: ΔE is 3 or more and less than 10
Assessment C: ΔE is 10 or more and less than 20
Assessment D: ΔE is 20 or more
<Anti-Clogging Characteristics>

An inkjet printer PM970C (manufactured by Seiko Epson Co., Ltd.) was filled with ink, printing was conducted continuously for 10 minutes, and after confirming that ink was being discharged from the nozzles, the printing was stopped. The ink compositions of Examples 1 to 13 and Comparative Examples 1 to 9 were left in the printer without capping the heads for 2 weeks in an environment of 40° C., 25% RH. Afterwards, nozzle cleaning operations were conducted, and then printing was conducted. The ink clogging characteristics were assessed by the number of times the cleaning operation was conducted until there were no scraped, missing or unsatisfactory characters, and printing the same as initially was possible.

[Judgment Criteria]
Assessment A: Printing the same as initially is obtained in 1 to 5 cleaning operations
Assessment B: Printing the same as initially is obtained in 6 to 10 cleaning operations
Assessment C: Printing the same as initially is obtained in 11 to 15 cleaning operations
Assessment D: Printing the same as initially cannot be obtained even with 16 or more cleaning operations The assessment results obtained are indicated in Table 5.

TABLE 5

|  |  | Ozone fastness | | NO₂ fastness | | Clogging characteristics |
|---|---|---|---|---|---|---|
|  |  | 12 hours | 24 hours | 12 hours | 24 hours |  |
| Examples | 1 | A | B | A | A | A |
|  | 2 | A | C | A | A | B |
|  | 3 | B | C | A | A | A |
|  | 4 | B | C | A | A | A |
|  | 5 | B | C | A | A | A |
|  | 6 | B | C | A | A | A |
|  | 7 | B | C | A | A | A |
|  | 8 | A | B | A | A | B |
|  | 9 | A | A | A | A | B |
|  | 10 | A | B | A | A | A |
|  | 11 | A | B | A | A | A |
|  | 12 | A | B | A | A | B |
|  | 13 | A | B | A | A | C |
| Comparative examples | 1 | C | D | A | A | A |
|  | 2 | D | D | A | A | A |
|  | 3 | A | B | D | D | A |
|  | 4 | A | C | D | D | B |
|  | 5 | B | C | D | D | A |
|  | 6 | C | D | A | A | A |
|  | 7 | C | D | A | A | B |
|  | 8 | A | A | D | D | A |
|  | 9 | A | B | D | D | A |

Examples 14 to 26 and Comparative Examples 10 to 18

The ink compositions of Examples 14 to 26 and Comparative Examples 10 to 18 were prepared by mixing and dissolving the components in the configurations and percentages indicated in Table 6, and were pressured filled using a membrane filter with a pore size of 1 μm.

TABLE 6

|  |  | Example | | | | | | | | | | | | |
|---|---|---|---|---|---|---|---|---|---|---|---|---|---|
|  |  | 14 | 15 | 16 | 17 | 18 | 19 | 20 | 21 | 22 | 23 | 24 | 25 | 26 |
| Color material | Compound A cited in Table 3 | 1 | 1.5 |  |  |  |  |  |  |  |  |  |  |  |
|  | Compound B cited in Table 3 |  |  | 1 | 1 |  |  |  |  |  |  |  |  |  |
|  | Compound C cited in Table 3 |  |  |  |  | 0.5 | 0.5 | 1 |  |  |  |  |  |  |
|  | Compound D cited in Table 3 |  |  |  |  |  |  |  | 0.5 | 1 |  |  |  |  |
|  | Compound E cited in Table 3 |  |  |  |  |  |  |  |  |  |  | 1 | 1.5 |  |
|  | Compound F cited in Table 3 |  |  |  |  |  |  |  |  |  |  |  | 1.5 | 0.5 |
|  | CI direct blue 199 (*4) |  |  |  |  |  |  |  |  |  |  |  |  |  |
| Solvents, etc. | Glycerin | 10 | 5 | 10 | 10 | 3 | 3 |  |  | 5 | 5 | 5 | 10 | 10 |
|  | Triethylene glycol | 10 | 10 | 10 | 10 | 15 | 15 | 20 | 20 | 5 | 10 | 10 | 3 | 3 |
|  | 2-pyrrolidone |  | 1 | 1 | 1 | 0.5 | 0.5 | 1 | 1 |  | 1 | 1 | 2 | 2 |

TABLE 6-continued

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| | Triethanolamine | | | | | 0.5 | 0.5 | | 1 | | | | 0.5 | 0.5 |
| | Diethylene glycol monobutyl ether | | 10 | 10 | | | | | | | | | 8 | 8 |
| | Triethylene glycol monobutyl ether | 10 | 10 | | | 12 | 12 | 10 | 10 | 10 | 10 | 10 | | |
| | Olfin E1010 (*5) | 1 | 1 | | | 0.5 | 0.5 | | | | | | 1 | 1 |
| | Olfin PD001 (*5) | | | 1 | 1 | | | 1 | 1 | 1 | | | 1 | 1 |
| | Lithium hydride 1 hydrate | | | 0.4 | | | | | | | | | | |
| | Potassium hydride | | | | | | | | | | | 1 | | |
| | Ammonia water (25% aq.) | | | | 2.7 | | | | | | | | | |
| Additives | Benzene sulfonate | | | | | | | | | | | 3 | | |
| | Sodium benzene sulfonate | | 3 | | | | | | | | | | | |
| | Sodium benzene-1,3-disulfonate 2 | | | | | 0.1 | | | | | | | | |
| | Sodium benzene-1,3-disulfonate 2 | | | | | | 0.5 | | | | | | | |
| | Naphthalene-1-sulfonate | | | 2 | 2 | | | | | | | | | |
| | Sodium naphthalene-1-sulfonate | | | | | | | 0.1 | | | | | | |
| | Sodium naphthalene-2-sulfonate | | | | | | | | | | | 3 | | |
| | Sodium naphthalene-1,5-disulfonate 2 | | 3 | | | | | | | | | | | |
| | Sodium naphthalene-1,6-disulfonate 2 | | | | | | | | | 5 | | | | |
| | Sodium naphthalene-2,6-disulfonate 2 | | | | | | | | 4 | | | | | |
| | Sodium naphthalene-2,7-disulfonate 2 | | | | | | | | | | | | 5 | |
| | Sodium naphthalene 1,3,6-trisulfonate 3 | | | | | | | | | | | | | 10 |
| | 6-amino naphthalene-1-sulfonate | | | | | | | | | | | | | |
| | Sodium p-hydroxy benzene sulfonate | | | | | | | | | | | | | |
| | Sodium 4,5-dihydroxynaphthalene-2,6-disulfonate 2 | | | | | | | | | | | | | |
| | Sodium 3-aminonaphthalene-1,5-disulfonate 2 | | | | | | | | | | | | | |
| | Sodium 7-amino-4-hydroxynaphthalene-2-sulfonate | | | | | | | | | | | | | |
| | Naphthalene-1-carbonate | | | | | | | | | | | | | |
| | Ethane-1-sulfonate | | | | | | | | | | | | | |
| Other | Proxel XL-2 (*5) | 0.3 | 0.3 | 0.3 | 0.3 | 0.3 | 0.3 | 0.3 | 0.3 | 0.3 | 0.3 | 0.3 | 0.3 | 0.3 |
| | Water | | | | | | Remainder | | | | | | | |
| Percentage of color material and aromatic sulfonate | | 1:3 | 1:2 | 1:2 | 1:2 | 1:0.2 | 1:1 | 1:0.2 | 1:10 | 1:4 | 1:3 | 1:2 | 1:3.3 | 1:10 |

TABLE 6-continued

|  |  | Comparative example | | | | | | | | |
|---|---|---|---|---|---|---|---|---|---|---|
|  |  | 10 | 11 | 12 | 13 | 14 | 15 | 16 | 17 | 18 |
| Color material | Compound A cited in Table 3 | 1 |  | 1 | 1.5 |  |  |  |  |  |
|  | Compound B cited in Table 3 |  |  |  |  | 1 | 1 | 1 |  |  |
|  | Compound C cited in Table 3 |  |  |  |  |  |  |  |  |  |
|  | Compound D cited in Table 3 |  |  |  |  |  |  |  | 1 |  |
|  | Compound E cited in Table 3 |  |  |  |  |  |  |  |  | 1 |
|  | Compound F cited in Table 3 |  |  |  |  |  |  |  |  |  |
|  | CI direct blue 199 (*4) |  | 1 |  |  |  |  |  |  |  |
| Solvents, etc. | Glycerin | 10 | 10 | 10 | 5 | 10 | 10 | 10 | 5 | 5 |
|  | Triethylene glycol | 10 | 10 | 10 | 10 | 10 | 10 | 10 | 5 | 10 |
|  | 2-pyrrolidone |  |  |  | 1 | 1 | 1 | 1 |  | 1 |
|  | Triethanolamine | 1 | 1 | 1 |  |  |  |  | 1 |  |
|  | Diethylene glycol monobutyl ether |  |  |  |  | 10 | 10 | 10 |  |  |
|  | Triethylene glycol monobutyl ether | 10 | 10 | 10 | 10 |  |  |  | 10 | 10 |
|  | Olfin E1010 (*5) | 1 | 1 | 1 | 1 |  |  |  |  | 1 |
|  | Olfin PD001 (*5) |  |  |  |  | 1 | 1 | 1 | 1 |  |
|  | Lithium hydride 1 hydrate |  |  |  |  | 0.4 | 0.4 |  |  |  |
|  | Potassium hydride |  |  |  |  |  |  |  |  |  |
|  | Ammonia water (25% aq.) |  |  |  |  |  |  | 2.6 |  |  |
| Additives | Benzene sulfonate |  |  |  |  |  |  |  |  |  |
|  | Sodium benzene sulfonate |  |  |  |  |  |  |  |  |  |
|  | Sodium benzene-1,3-disulfonate 2 |  |  |  |  |  |  |  |  |  |
|  | Sodium benzene-1,3-disulfonate 2 |  |  |  |  |  |  |  |  |  |
|  | Naphthalene-1-sulfonate |  |  |  |  |  |  |  |  |  |
|  | Sodium naphthalene-1-sulfonate |  |  |  |  |  |  |  |  |  |
|  | Sodium naphthalene-2-sulfonate |  |  |  |  |  |  |  |  |  |
|  | Sodium naphthalene-1,5-disulfonate 2 |  | 3 |  |  |  |  |  |  |  |
|  | Sodium naphthalene-1,6-disulfonate 2 |  |  |  |  |  |  |  |  |  |
|  | Sodium naphthalene-2,6-disulfonate 2 |  |  |  |  |  |  |  |  |  |
|  | Sodium naphthalene-2,7-disulfonate 2 |  |  |  |  |  |  |  |  |  |
|  | Sodium naphthalene 1,3,6-trisulfonate 3 |  |  |  |  |  |  |  |  |  |
|  | 6-amino naphthalene-1-sulfonate |  |  |  |  | 2 |  |  |  |  |
|  | Sodium p-hydroxy benzene sulfonate |  |  |  | 3 |  |  |  |  |  |

TABLE 6-continued

| | | | | | | | | | | |
|---|---|---|---|---|---|---|---|---|---|---|
| | Sodium 4,5-dihydroxynaphthalene-2,6-disulfonate 2 | | | | | | | 4 | | |
| | Sodium 3-aminonaphthalene-1,5-disulfonate 2 | | | 3 | | | | | | |
| | Sodium 7-amino-4-hydroxynaphthalene-2-sulfonate | | | | | | | | 3 | |
| | Naphthalene-1-carbonate | | | | | | 2 | | | |
| | Ethane-1-sulfonate | | | | | | | 2 | | |
| Other | Proxel XL-2 (*5) | 0.3 | 0.3 | 0.3 | 0.3 | 0.3 | 0.3 | 0.3 | 0.3 | 0.3 |
| | Water | | | | Remainder | | | | | |
| Percentage of color material and aromatic sulfonate | | — | 1:3 | 1:3 | 1:2 | 1:2 | — | — | 1:4 | 1:3 |

(*4) A substance having the absorption wavelength cited in FIG. 1 is used.
(*5) Manufactured by Nisshin Chemical Co., Ltd.
(*6) Manufactured by Avecia Ltd.

Further, the components of the ink compositions indicated in Table 6 and the weight % of the components in relation to the total weight of the ink composition is indicated, and the remainder is water. In addition, the compounds (compounds A to F) indicated in the aforementioned Table 3 were used for the color materials in the examples and comparative examples. However, C.I. direct blue 199 was used in Comparative Example 11.

An inkjet printer PM 970C (manufactured by Seiko Epson Co., Ltd.) was used to print the aforementioned ink compositions of Examples 14 to 26 and Comparative Examples 10 to 18 onto an inkjet custom recording material (Premium Glossy Photo Paper manufactured by Seiko Epson Co., Ltd.), and the following assessments were conducted.

<Ozone Fastness Test>

Prints were obtained by using the aforementioned cartridge to conduct the printing and by adjusting the print duty so that the OD (optical density) was in the range of 0.9 to 1.1, and the prints obtained were exposed for a specified time (12 and 24 hours) under the conditions of 24° C., relative humidity 60% RH, and ozone concentration 20 ppm using an ozone weather meter Model OMS-H (product name, manufactured by Suga Test equipment (Co., Ltd.)).

After exposure, the OD of the various prints was measured using a concentration meter (Spectrolino: manufactured by Gretag Co.), and the residual optical density percentage (ROD) was derived by the following formula, and assessments were made using the judgment criteria below.

ROD (%)=(D/$D_0$)×100

D: OD after exposure test $D_0$: OD prior to exposure test (Here, the measurement conditions were: Filter: Red; light source: D50; angle of visual field: 2 degrees)

[Judgment Criteria]

Assessment A: ROD of 90% or more

Assessment B: ROD of 80% or more and less than 90%

Assessment C: ROD of 70% or more and less than 80%

Assessment D: ROD of 70% or less

<Nitrous Oxide Test>

Prints were obtained by using the aforementioned cartridge filled with the ink compositions of Examples 14 to 26 and Comparative Examples 10 to 18 to conduct the printing and by adjusting the print duty so that the OD (optical density) was in the range of 0.9 to 1.1, and the prints were exposed for a specified time (12 and 24 hours) under the conditions of 24° C., relative humidity 60% RH, and nitrogen dioxide concentration 10 ppm using an gas corrosion test meter Model GS-UV (product name, manufactured by Suga Test equipment (Co., Ltd.)).

After exposure, the CIE-L*a*b* coordinates of the various prints were measured using a concentration meter (Spectrolino: manufactured by Gretag Co.), and the color difference (ΔE) was derived by the following formula, and assessments were made using the judgment criteria below.

$$\Delta E = \{(L^* - L_0^*)^2 + (a^* - a_0^*)^2 + (b^* - b_0^*)^2\}^{1/2}$$

L*, a*, b*: Coordinate values after exposure test $L_0^*$, $a_0^*$, $b_0^*$: Coordinate values before exposure test

[Judgment Criteria]

Assessment A: ΔE is less than 3

Assessment B: ΔE is 3 or more and less than 10

Assessment C: ΔE is 10 or more and less than 20

Assessment D: ΔE is 20 or more

<Anti-Clogging Characteristics>

An inkjet printer PM970C (manufactured by Seiko Epson Co., Ltd.) was filled with ink, printing was conducted continuously for 10 minutes, and after confirming that ink was being discharged from the nozzles, the printing was stopped. The ink compositions of Examples 14 to 26 and Comparative Examples 10 to 18 were left in the printer without capping the heads for 2 weeks in an environment of 40° C., 25% RH. Afterwards, nozzle cleaning operations were conducted, and then printing was conducted. The ink clogging characteristics were assessed by the number of times the cleaning operation was conducted until there were no scraped, missing or unsatisfactory characters, and printing the same as initially was possible.

[Judgment Criteria]

Assessment A: Printing the same as initially is obtained in 1 to 5 cleaning operations Assessment B: Printing the same as initially is obtained in 6 to 10 cleaning operations Assessment C: Printing the same as initially is obtained in 11 to 15 cleaning operations Assessment D: Printing the same as initially cannot be obtained even with 16 or more cleaning operations The assessment results obtained are indicated in Table 7.

TABLE 7

| | | Ozone fastness | | $NO_2$ fastness | | |
|---|---|---|---|---|---|---|
| | | 12 hours | 24 hours | 12 hours | 24 hours | Clogging characteristics |
| Examples | 14 | A | B | A | A | A |
| | 15 | A | C | A | A | B |
| | 16 | B | C | A | A | A |
| | 17 | B | C | A | A | A |
| | 18 | B | C | A | A | A |
| | 19 | B | C | A | A | A |
| | 20 | B | C | A | A | A |
| | 21 | A | C | A | A | B |
| | 22 | A | C | A | A | B |
| | 23 | B | C | A | A | A |
| | 24 | B | C | A | A | A |
| | 25 | A | B | A | A | B |
| | 26 | A | B | A | A | C |
| Comparative examples | 10 | C | D | A | A | A |
| | 11 | D | D | A | A | A |
| | 12 | A | B | D | D | A |
| | 13 | A | C | D | D | B |
| | 14 | B | C | D | D | A |
| | 15 | C | D | A | A | A |
| | 16 | C | D | A | A | B |
| | 17 | A | C | D | D | A |
| | 18 | B | C | D | D | A |

As explained above, the ink compositions of the present invention have a superior effect that can improve the preservation characteristics (gas fastness) of the images obtained, and can effectively prevent rapid fading of the image.

What is claimed is:

1. An ink composition, wherein at least water, a phthalocyanine group cyan dye indicated by the general formula (I) below, and an aromatic compound having a sulfone group and/or the salt thereof represented by the general formulae (a) and/or (b) below are contained:

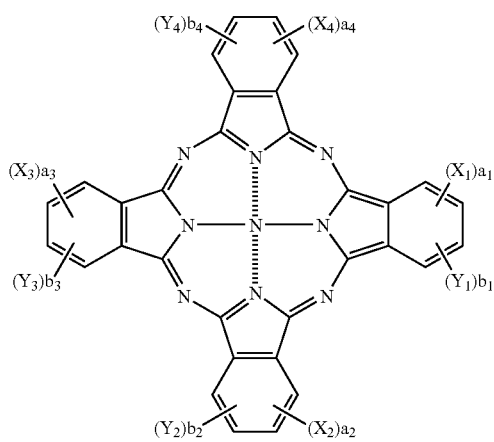

(I)

wherein, $X_1$, $X_2$, $X_3$ and $X_4$ each independently represents either —SO-Z or —$SO_2$-Z; wherein Z each independently represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group;

$Y_1$, $Y_2$, $Y_3$ and $Y_4$ each independently represents a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureide group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group or ionic hydrophilic group; and these various groups may have substituents;

$a_1$ to $a_4$ and $b_1$ to $b_4$ represent the number of substituents of $X_1$ to $X_4$ and $Y_1$ to $Y_4$ respectively; and $a_1$ to $a_4$ each independently is an integer of 0 to 4, but not all may be 0 at the same time; $b_1$ to $b_4$ each independently is an integer of 0 to 4;

M represents a hydrogen atom, metal element or oxide thereof, hydroxide, or halogenated compound;

with the proviso that, at least one of $X_1$, $X_2$, $X_3$, $X_4$, $Y_1$, $Y_2$, $Y_3$, and $Y_4$ is an ionic hydrophilic group or a group having an ionic hydrophilic group as a substituent;

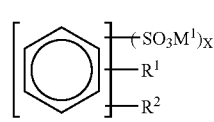

(a)

wherein, $M^1$ indicates a counter-ion comprising a salt; X indicates an integer of 1 to 3; $R^1$ and $R^2$ indicate respectively a hydrogen atom, an alkyl group having 1 to 6 carbon atoms, or an alkoxy group having 1 to 6 carbon atoms; and $R^1$ and $R^2$ may be the same or different;

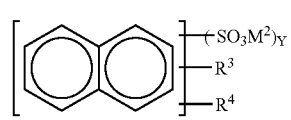

(b)

wherein $M^2$ indicates a counter-ion comprising a salt; Y indicates an integer of 1 to 4; $R^3$ and $R^4$ indicate respectively a hydrogen atom, an alkyl group having 1 to 6 carbon atoms or an alkoxy group having 1 to 6 carbon atoms; and $R^3$ and $R^4$ may be the same or different.

2. An ink composition, wherein at least water, the phthalocyanine group cyan dye indicated by the general formula (VIII) below, and an aromatic compound having a sulfone group and/or the salt thereof represented by the general formulae (a) and/or (b) below are contained:

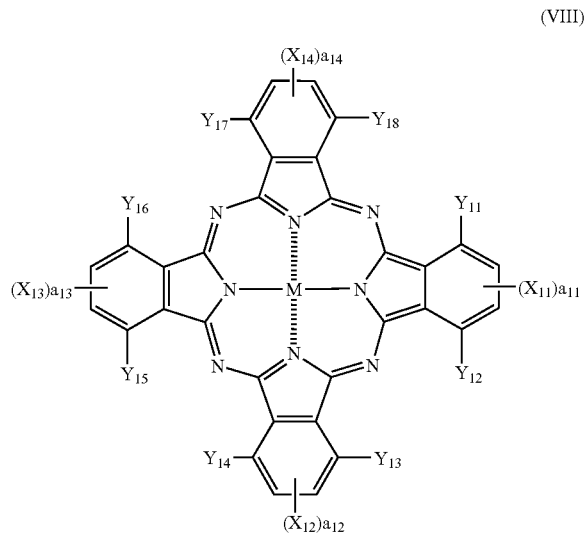

(VIII)

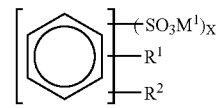

(a)

wherein $M^1$ indicates a counter-ion comprising a salt; X indicates an integer of 1 to 3; $R^1$ and $R^2$ respectively indicate a hydrogen atom, an alkyl group having 1 to 6 carbon atoms, or an alkoxy group having 1 to 6 carbon atoms; and $R^1$ and $R^2$ may be the same or different;

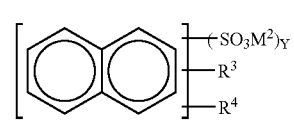

(b)

wherein $M^2$ indicates a counter-ion comprising a salt; Y indicates an integer of 1 to 4; $R^3$ and $R^4$ respectively indicate a hydrogen atom, an alkyl group having 1 to 6 carbon atoms or an alkoxy group having 1 to 6 carbon atoms; and $R^3$ and $R^4$ may be the same or different.

wherein $X_{11}$, $X_{12}$, $X_{13}$ and $X_{14}$ each independently represents —$SO_2NR_1R_2$ an/or a sulfone group with the proviso that $X_{11}$, $X_{12}$, $X_{13}$ and $X_{14}$ may not all be sulfone groups at the same time, $R_1$ each independently represents, if a plurality thereof are present, a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group; $R_2$ each independently represents, if a plurality thereof are present, a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group or $R_1$ and $R_2$ may be mutually bonded and may form a nitrogen heterocycle with 5 to 6 members; $Y_{11}$, $Y_{12}$, $Y_{13}$, $Y_{14}$ $Y_{15}$, $Y_{16}$ $Y_{17}$ and $Y_{18}$ each independently represents a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureide group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group or ionic hydrophilic group; and these various groups may have substituents;

$a_{11}$ to $a_{14}$ respectively represent the number of substituents of $X_{11}$ to $X_{14}$, and each independently is an integer of 0 to 2, but not all may be 0 at the same time;

M represents a hydrogen atom, metal element or oxide thereof, hydroxide, or halogenated compound;

with the proviso that at least one of $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$, and $Y_{18}$ is an ionic hydrophilic group or a group having an ionic hydrophilic group as a substituent;

3. The ink composition according to claim 1, wherein the phthalocyanine group cyan dye indicated in the general formula (I) is a phthalocyanine group dye indicated in the general formula (II) below:

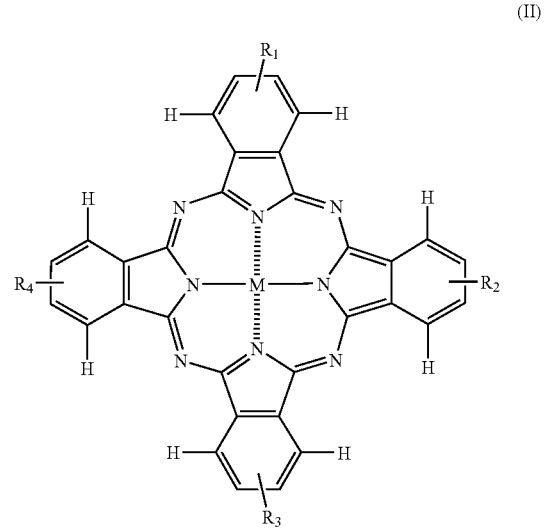

(II)

wherein M is the same as in the general formula (I), and $R_1$ to $R_4$ each independently represents —$SO_2Z$, wherein Z is the same as in the general formula (I); with the proviso that at least one Z has an ionic hydrophilic group as a substituent.

4. The ink composition according to claim 2, wherein the phthalocyanine group cyan dye indicated in the general formula (VIII) is a phthalocyanine group dye indicated in the general formula (IX) below:

(IX)

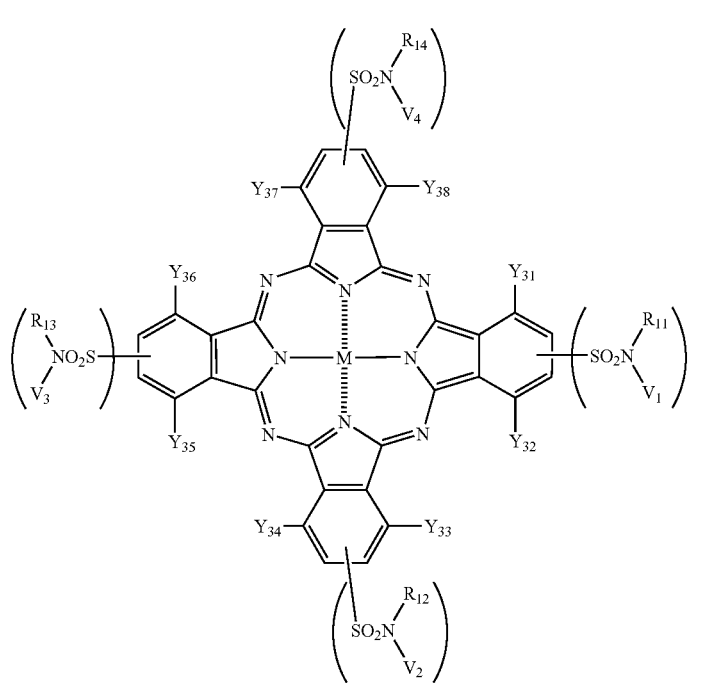

wherein $R_{11}$, $R_{12}$, $R_{13}$, and $R_{14}$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group;

$V_1$, $V_2$, $V_3$, and $V_4$ each independently represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group;

$Y_{31}$, $Y_{32}$, $Y_{33}$, $Y_{34}$, $Y_{35}$, $Y_{36}$, $Y_{37}$, and $Y_{38}$ each independently represents a hydrogen atom, halogen atom, alkyl group, cycloalkyl group, alkenyl group, aralkyl group, aryl group, heterocyclic group, cyano group, hydroxy group, nitro group, amino group, alkylamino group, alkoxy group, aryloxy group, amide group, arylamino group, ureide group, sulfamoylamino group, alkylthio group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group or ionic hydrophilic group; and these various groups may have substituents;

M is the same as the M in the general formula (VIII);

with the proviso that at least one of $R_{11}$, $R_{12}$, $R_{13}$, $R_{14}$, $V_1$, $V_2$, $V_3$, $V_4$, $Y_{31}$, $Y_{32}$, $Y_{33}$, $Y_{34}$, $Y_{35}$, $Y_{36}$, $Y_{37}$, and $Y_{38}$ is an ionic hydrophilic group or a group having an ionic hydrophilic group as a substituent.

5. The ink composition according to claim 1, wherein the aromatic compound having a sulfone group and/or the salt thereof has two or more sulfone groups.

6. The ink composition according to claim 1, wherein the aromatic compound having a sulfone group and/or the salt thereof is at least one kind selected from the group comprising 1,3-benzene disulfonate, naphthalene-1,5-disulfonate, naphthalene-1,6-disulfonate, naphthalene-2,6-disulfonate, naphthalene-2,7-disulfonate, naphthalene-1,3,6-trisulfonate, and the salts thereof.

7. The ink composition according to claim 1, wherein the aromatic compound having a sulfone group and/or the salt thereof is contained at 0.1 to 10 weight % in relation to the total amount of the ink composition.

8. The ink composition according to claim 1, wherein the content ratio of the phthalocyanine group cyan dye and the aromatic compound having a sulfone group and/or the salt thereof is within the range of 1:0.1 to 1:10.

9. The ink composition according to claim 1 further comprising nonionic surfactant.

10. The ink composition according to claim 9, wherein the nonionic surfactant is an acetylene glycol group surfactant.

11. The ink composition according to claim 9, wherein the nonionic surfactant is contained at 0.1 to 5 weight % in relation to the total amount of the ink composition.

12. The ink composition according to claim 1-further comprising a penetrating agent.

13. The ink composition according to claim 12, wherein the penetrating agent is a glycol ether.

14. The ink composition according to claim 1, wherein the pH of the ink composition at 20° C. is 8.0 to 10.5.

15. An inkjet recording method comprising providing the ink composition according to claim 2, and depositing the ink composition on a recording medium.

16. The recording method according to claim 15, wherein the depositing comprises ejecting the ink composition from an inkjet head that forms ink drops by mechanical deformation of electrostriction elements.

17. An ink cartridge at least comprising the ink composition described in claim 1.

18. An inkjet recording method for conducting recording comprising providing the ink composition of claim 1 and discharging ink droplets of the ink composition and causing the ink droplets to adhere to a recording medium.

19. A recorded matter which is obtained by the method of claim 18.

* * * * *